(12) United States Patent
Hernandez et al.

(10) Patent No.: US 12,462,241 B2
(45) Date of Patent: Nov. 4, 2025

(54) SYNCHRONIZATION OF LOCAL DEVICES IN POINT-OF-SALE ENVIRONMENT

(71) Applicant: Block, Inc., Oakland, CA (US)

(72) Inventors: Marc Hernandez, San Francisco, CA (US); Brian Grassadonia, San Francisco, CA (US)

(73) Assignee: Block, Inc., Oakland, CA (US)

( * ) Notice: Subject to any disclaimer, the term of this patent is extended or adjusted under 35 U.S.C. 154(b) by 0 days.

(21) Appl. No.: 18/959,504

(22) Filed: Nov. 25, 2024

(65) Prior Publication Data

US 2025/0086607 A1 Mar. 13, 2025

Related U.S. Application Data

(63) Continuation of application No. 18/363,616, filed on Aug. 1, 2023, now Pat. No. 12,254,459, which is a continuation of application No. 17/334,382, filed on May 28, 2021, now Pat. No. 11,769,137, which is a continuation of application No. 14/858,974, filed on Sep. 18, 2015, now Pat. No. 11,023,878.

(60) Provisional application No. 62/171,713, filed on Jun. 5, 2015.

(51) Int. Cl.
| | |
|---|---|
| G06Q 20/32 | (2012.01) |
| G06Q 20/20 | (2012.01) |
| G06Q 20/38 | (2012.01) |
| H04W 40/20 | (2009.01) |
| H04W 84/18 | (2009.01) |

(52) U.S. Cl.
CPC ....... *G06Q 20/3224* (2013.01); *G06Q 20/202* (2013.01); *G06Q 20/3223* (2013.01); *G06Q 20/325* (2013.01); *G06Q 20/3821* (2013.01); *H04W 40/20* (2013.01); *H04W 84/18* (2013.01)

(58) Field of Classification Search
CPC .......... G06Q 20/3224; G06Q 20/3223; G06Q 20/3255; G06Q 20/223; G06Q 20/3278; G06Q 20/325; G06Q 20/202; G06Q 20/3821; H04W 40/20; H04W 84/18
See application file for complete search history.

(56) References Cited

U.S. PATENT DOCUMENTS

| | | |
|---|---|---|
| 7,089,208 B1 | 8/2006 | Levchin et al. |
| 7,694,287 B2 | 4/2010 | Singh et al. |
| 8,214,196 B2 | 7/2012 | Yamada et al. |

(Continued)

FOREIGN PATENT DOCUMENTS

WO WO-2014105892 A2 * 7/2014 ............. G06Q 20/12

*Primary Examiner* — Florian M Zeender
*Assistant Examiner* — Milena Racic
(74) *Attorney, Agent, or Firm* — Lee & Hayes, P.C.

(57) ABSTRACT

In some examples, a point-of-sale (POS) device may detect an offline mode that prevents the POS device or one or more other devices (which couple with the POS device via a short-range network) from communicating with a remote server via a long-range network. Responsive to detecting the offline mode, the POS device may authenticate the other devices to communicate over the short-range network and synchronize, between the POS and the other devices, information associated with an order over the short-range network. In response to detecting that the offline mode has concluded, the POS device may transmit the information from the POS device or at least one of the other devices to the remove server via the long-range network.

20 Claims, 11 Drawing Sheets

(56) References Cited

U.S. PATENT DOCUMENTS

| | | | |
|---|---|---|---|
| 8,307,410 B2 * | 11/2012 | Martin | G06Q 20/3572 380/279 |
| 8,326,769 B1 | 12/2012 | Weisman | |
| 8,504,423 B2 | 8/2013 | Rotbard et al. | |
| 8,720,771 B2 | 5/2014 | Mackinnon | |
| 8,762,272 B1 | 6/2014 | Cozens et al. | |
| 9,033,217 B2 * | 5/2015 | Williams | G06Q 20/202 235/375 |
| 9,218,594 B2 | 12/2015 | Ramakrishna et al. | |
| 10,853,773 B2 | 12/2020 | Feder et al. | |
| 10,878,422 B2 | 12/2020 | Sheets | |
| 11,354,632 B1 * | 6/2022 | Hill | H04W 12/73 |
| 11,769,137 B2 | 9/2023 | Hernandez et al. | |
| 11,853,990 B2 * | 12/2023 | Speiser | G06Q 20/202 |
| 2006/0085259 A1 | 4/2006 | Nicholas et al. | |
| 2007/0203836 A1 | 8/2007 | Dodin | |
| 2007/0208816 A1 | 9/2007 | Baldwin et al. | |
| 2008/0288277 A1 | 11/2008 | Fasciano | |
| 2009/0012895 A1 | 1/2009 | Mehrabi | |
| 2009/0094134 A1 | 4/2009 | Toomer et al. | |
| 2009/0119212 A1 | 5/2009 | Liu et al. | |
| 2009/0164374 A1 | 6/2009 | Shastry | |
| 2009/0182664 A1 | 7/2009 | Trombley | |
| 2010/0057586 A1 | 3/2010 | Chow | |
| 2010/0211938 A1 | 8/2010 | Singh et al. | |
| 2010/0306099 A1 | 12/2010 | Hirson et al. | |
| 2010/0312696 A1 | 12/2010 | Sinha et al. | |
| 2011/0119155 A1 | 5/2011 | Hammad et al. | |
| 2011/0251922 A1 | 10/2011 | Cavagnaro | |
| 2012/0054102 A1 | 3/2012 | Schwartz et al. | |
| 2012/0143761 A1 | 6/2012 | Doran et al. | |
| 2012/0158589 A1 | 6/2012 | Katzin et al. | |
| 2012/0221437 A1 | 8/2012 | Yoo | |
| 2012/0265678 A1 | 10/2012 | Ross et al. | |
| 2013/0117185 A1 | 5/2013 | Collison et al. | |
| 2013/0262316 A1 | 10/2013 | Hruska | |
| 2014/0122328 A1 | 5/2014 | Grigg | |
| 2014/0207679 A1 | 7/2014 | Cho | |
| 2014/0279447 A1 | 9/2014 | Dorsey et al. | |
| 2014/0330721 A1 * | 11/2014 | Wang | G06Q 20/40 705/44 |
| 2014/0372300 A1 | 12/2014 | Blythe | |
| 2015/0006386 A1 | 1/2015 | Tebbe | |
| 2016/0005024 A1 | 1/2016 | Harrell | |
| 2016/0117670 A1 | 4/2016 | Davis | |
| 2016/0125368 A1 | 5/2016 | Grassadonia et al. | |
| 2016/0125369 A1 | 5/2016 | Grassadonia et al. | |
| 2016/0125370 A1 | 5/2016 | Grassadonia et al. | |
| 2016/0125371 A1 | 5/2016 | Grassadonia et al. | |
| 2017/0011383 A1 | 1/2017 | Melzer | |
| 2023/0263733 A1 | 8/2023 | Cleveland et al. | |
| 2023/0376929 A1 | 11/2023 | Hernandez et al. | |
| 2024/0320639 A1 | 9/2024 | Kolchin et al. | |

* cited by examiner

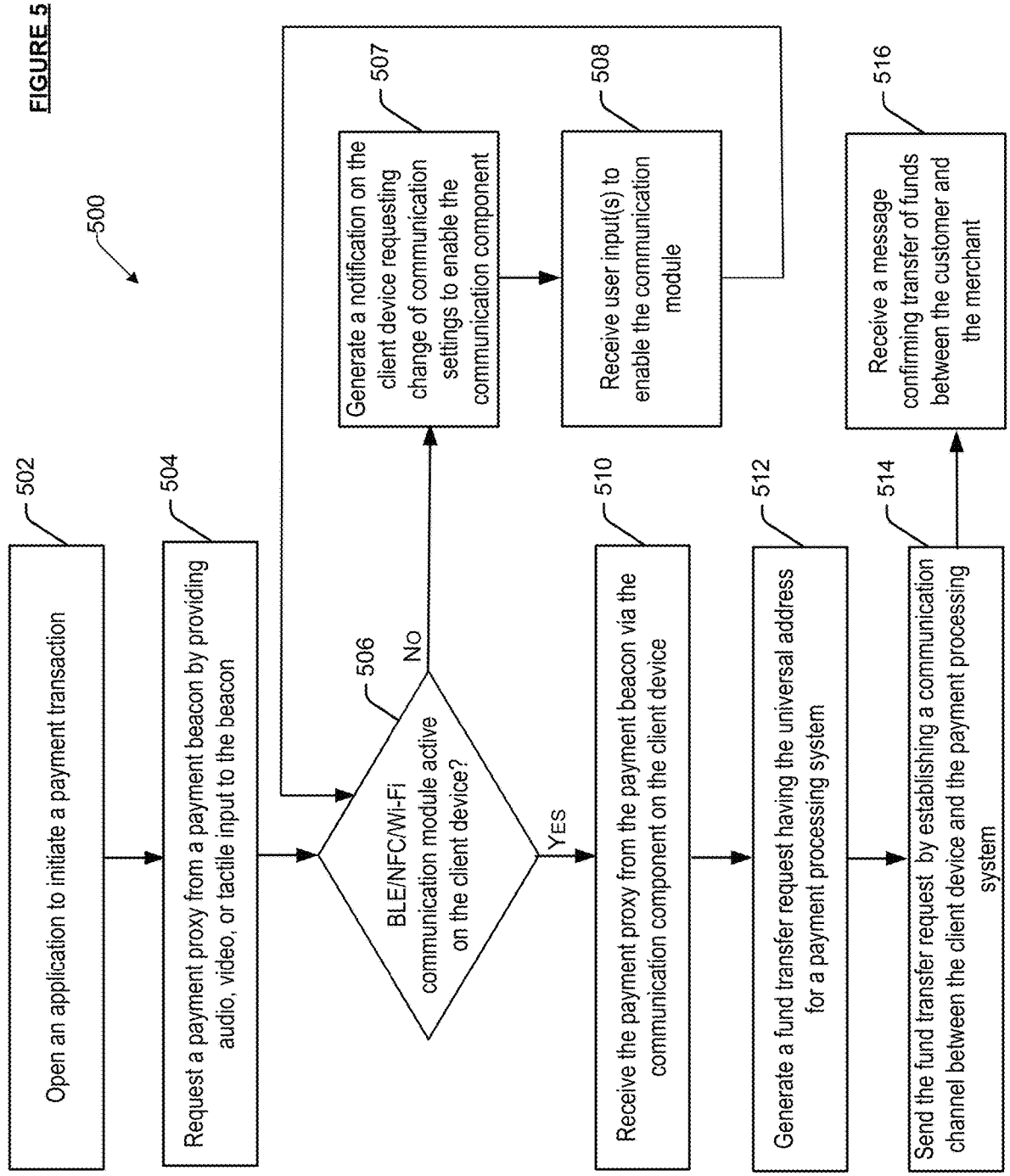

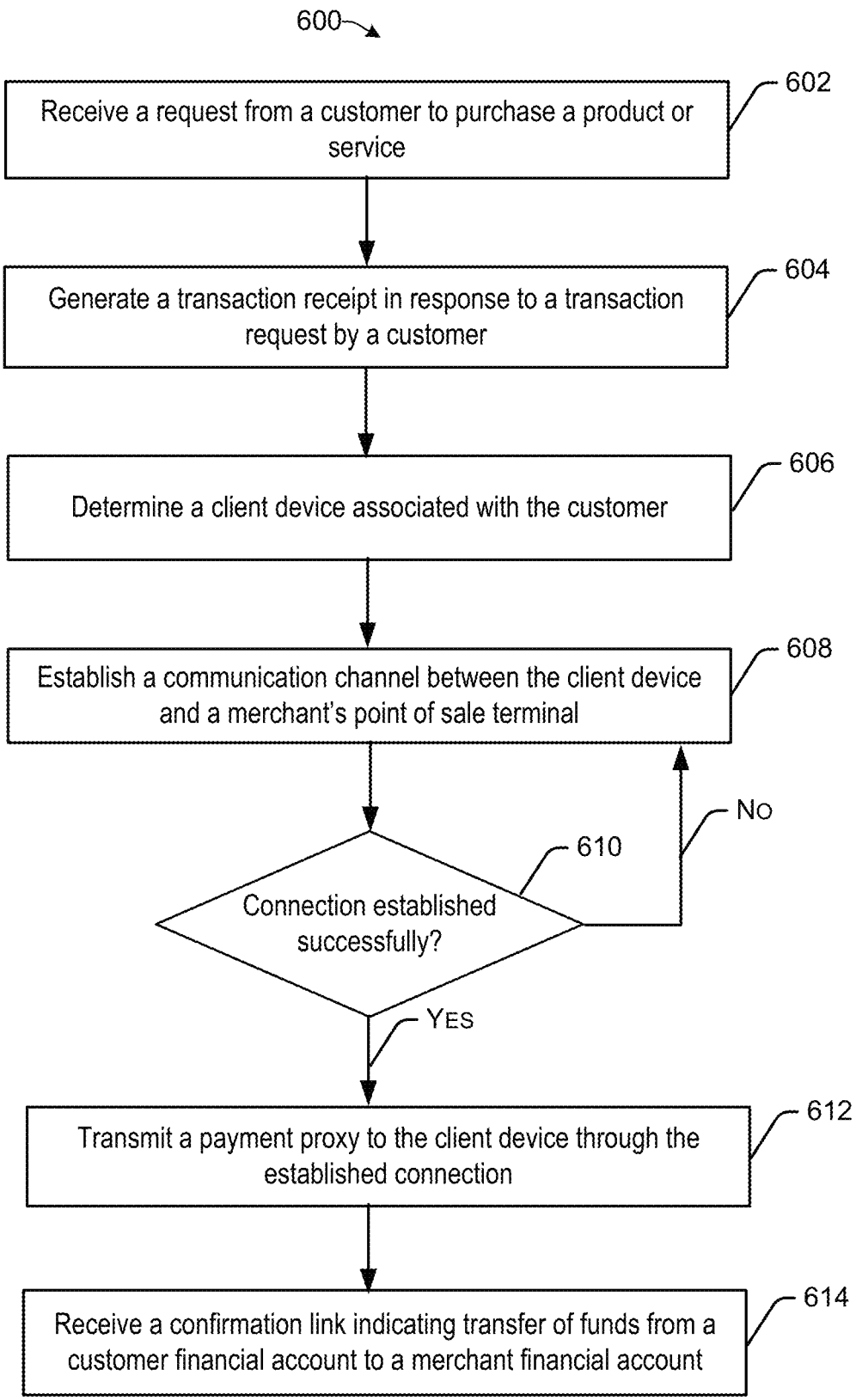

SYNCHRONIZATION OF LOCAL DEVICES IN POINT-OF-SALE ENVIRONMENT

CROSS REFERENCE TO RELATED APPLICATIONS

This application is a continuation of and claims priority to U.S. patent application Ser. No. 18/363,616, filed Aug. 1, 2023, which is a continuation of and claims priority to U.S. patent application Ser. No. 17/334,382, filed May 28, 2021, and issued as U.S. Pat. No. 11,769,137 on Sep. 26, 2023, which is a continuation of and claims priority to U.S. patent application Ser. No. 14/858,974, filed Sep. 18, 2015, and issued as U.S. Pat. No. 11,023,878 on Jun. 1, 2021, which claims the benefit of U.S. Provisional Patent Application No. 62/171,713, filed Jun. 5, 2015, the entire contents of which are incorporated herein by reference.

TECHNICAL FIELD

Solutions exist to provide individuals with the ability to transfer money between one another electronically through, e.g., Automated Clearing House transfers, wire transfers, etc. Such solutions have also been implemented between a merchant and a user to enable payment transactions. However, creating accounts with one or more financial institutions and sharing such sensitive account information to enable money transfers may be both time-consuming and risky.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features. Moreover, multiple instances of the same part are designated by a common prefix separated from the instance number by a dash. The drawings are not to scale.

FIG. 5 is a flow diagram illustrating an example method of processing payment transactions between a merchant and a customer, according to an embodiment of the present subject matter.

FIG. 6 is a flow diagram illustrating an example method of exchanging information between the customer and the merchant, according to an embodiment of the present subject matter.

DETAILED DESCRIPTION

Figure 1:
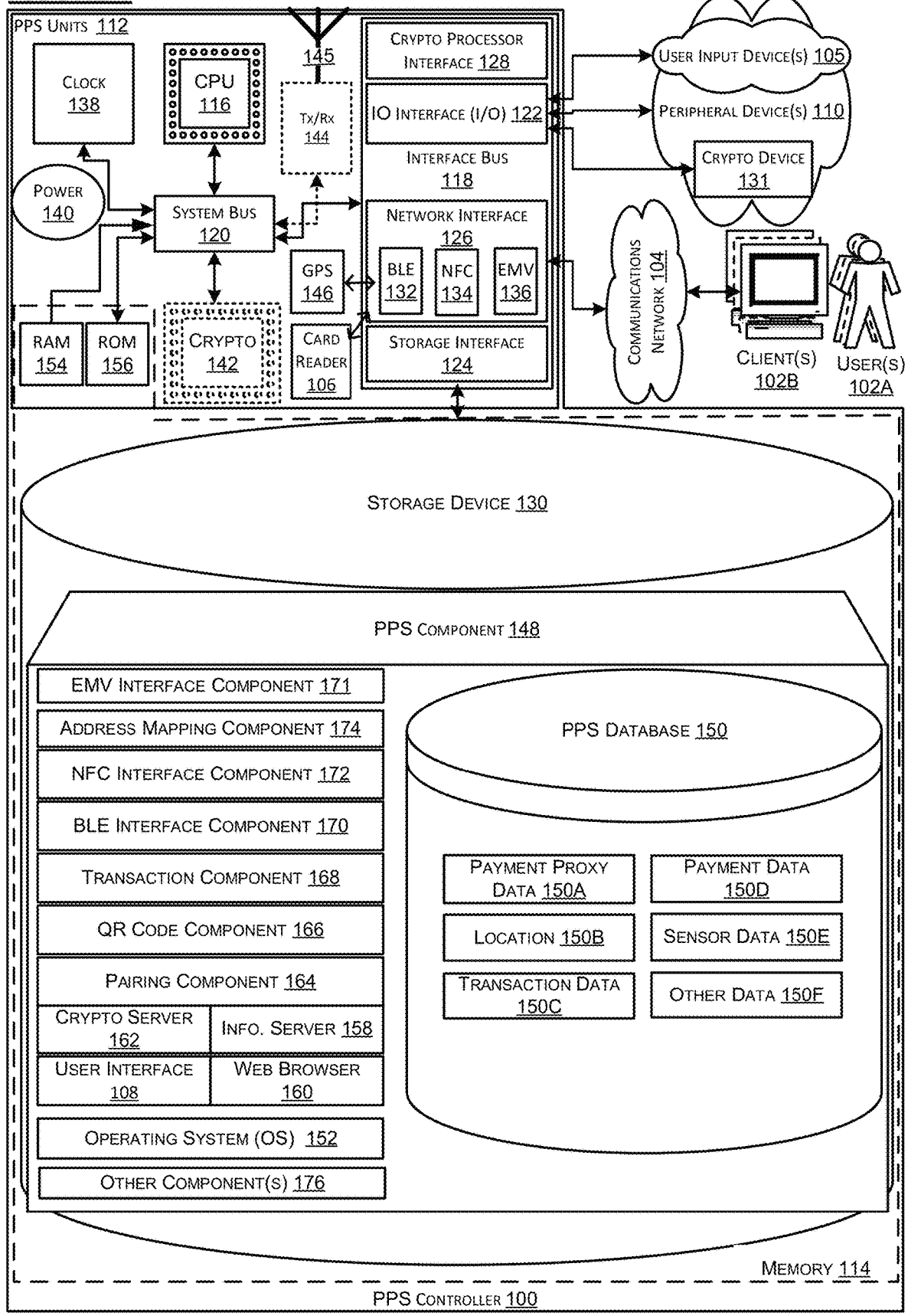
FIG. 1 is a block diagram illustrating components of a payment processing system (PPS) controller, according to an embodiment of the present subject matter.

Embodiments of apparatuses, methods, and systems for transmitting payment proxy information are described herein. Traditionally, a customer provides a payment card, such as a credit card in a merchant associated card reader connected with a point-of-sale (POS) terminal, to process a transaction involving a product or service. In some cases, the customer or a sender requests for the financial account information of the merchant or recipient to furnish his or her account with funds and complete the transaction. In such exemplary scenarios, the merchant or a representative of the merchant has to be present in order to either furnish the financial account information or accept payments through the POS system. However, the merchant may not be comfortable divulging personal account information to every customer or sender. Additionally, the merchant may not find it economically or geographically feasible to establish a POS infrastructure at all locations, particularly at locations or businesses that are sparsely populated, pop-up or seasonal.

To this end, embodiments of the present subject matter provide apparatuses, methods and systems for transmitting payment proxy, which is indicative of the financial or bank account of the merchant/recipient. Using the payment proxy of the recipient, the customer or sender processes a transaction for a product or service via web-application, messaging application, a forum message, a social networking website or application, a third-party application, or a webpage with customized uniform resource locator (URL).

In some embodiments, a device, such as a payment object reader (e.g., a card reader configured to accept payments through a credit or debit card), payment beacon or a payment object reader configured as a payment beacon, operating on wired or wireless technologies, e.g., Bluetooth, Bluetooth Low Energy (BLE), Wi-Fi, Radio Frequency Identification (RFID), Near-Frequency Communication (NFC), etc., may persistently or on activation of the payment object reader, e.g., in response to a visual, audio or tactile input, send or receive payment related information like the payment proxy of the merchant. The payment proxy can have syntax of a monetary currency indicator preceding an alphanumeric character. A customer device, such as a mobile phone or a tablet, obtains the payment proxy via a Bluetooth receiver component, installed within the customer device. On receiving the payment proxy, the customer may access a portal (such as a web application, an application stored on the device, a forum, a website, etc.) and specify, with or without an explicit command, an intention to transfer a predefined amount to the customer, which can then be packaged as a payment request and sent to a payment processing system. The payment processing system receives the request through the portal. In one implementation, the payment processing system can optionally parse the payment proxy and apply a syntax matching algorithm to match the received payment proxy with registered entries in its database. The payment processing system can then communicate with a financial institution (e.g., an issuer or an acquirer) to determine details of the financial account associated with the payment proxy and process the transaction on receiving confirmation from the financial institution. In some embodiments, a merchant server can maintain a database including the information of financial accounts.

In some embodiments, the payment beacon is not in the same vicinity as the customer device. In such cases, a device in proximity to the customer device can serve as an intermediate device to store and carry the payment information to the beacon in proximity to the payment beacon, which then transfers the information to the payment beacon on behalf of the customer device.

Even though the description hereinafter is in terms of a customer and a merchant interacting for a product or service, the description can be extended to any two parties interacting in a financial transaction.

Embodiments of the methods and systems described can be installed in the context of a multi-functional point-of-sale system or as a beacon of data without a payment receiving means. In either of the scenarios, the customer may obtain payment related information related to the merchant prior to or during the time of transactions, making the entire transaction experience seamless and convenient, particularly at places where a merchant or a traditional point-of-sale system may be difficult to install. The embodiments described herein can be configured to operate in both real-time and offline modes and for direct and remote transactions. Furthermore, such embodiments are configured to operate on a variety of mobile devices, web applications, mobile applications, POS topologies, payment cards, computer networks, and environments.

Certain embodiments may be configured for use in stand-alone devices (e.g., PDAs, smartphones, laptops, PCs and/or the like). Other embodiments may be adapted for use in a first device (e.g., mobile phone, and/or the like), which may be connected to a second device (e.g., tablet computer and/or the like) via any type of connection (e.g., Bluetooth, USB, Wi-Fi, serial, parallel, RF, infrared, optical and/or the like) to exchange various types of data (e.g., raw signals, processed data, recorded data/signals and/or the like). In such embodiments, all or part of the data processing may happen on the first device, in other embodiments all or part of the data processing may happen on the second device. In some embodiments there maybe more than two devices connected and performing different functions and the connection between devices and processing may happen in stages at different times on different devices. Certain embodiments may be configured to work with various types of processors (e.g., ARM, Raspberry Pi and/or the like).

While aspects of the described subject matter can be implemented in any number of different systems, circuitries, environments, and/or configurations, the embodiments are described in the context of the following exemplary system(s) and configuration(s). The descriptions and details of well-known components are omitted for simplicity of the description. It will thus be appreciated that those skilled in the art will be able to devise various arrangements that, although not explicitly described or shown herein, embody the principles of the present subject matter. Furthermore, all examples recited herein are intended to be for illustrative purposes only to aid the reader in understanding the principles of the present subject matter and the concepts contributed by the inventor(s) to furthering the art, and are to be construed as being without limitation to such specifically recited examples and conditions. Moreover, all statements herein reciting principles, aspects, and embodiments of the present subject matter, as well as specific examples thereof, are intended to encompass equivalents thereof.

It should also be appreciated by those skilled in the art that any block diagrams, steps, or sub-processes herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown. The order in which the methods are described are not intended to be construed as a limitation, and any number of the described method blocks can be deleted, moved, added, subdivided, combined, and/or modified in any order to implement the methods, or an alternative combination or sub-combinations. Also, while steps, sub-processes or blocks are at times shown as being performed in series, some steps, sub-processes or blocks can instead be performed in parallel, or can be performed at different times as will be recognized by a person of ordinary skill in the art. Further any specific numbers noted herein are only examples; alternative implementations can employ differing values or ranges. Furthermore, the methods can be implemented in any suitable hardware, software, firmware, or combination thereof.

The following description provides specific details for a thorough understanding and enabling description of these embodiments. One skilled in the relevant art will understand, however, that the embodiments discussed herein may be practiced without many of these details. Likewise, one skilled in the relevant art will also understand that the embodiments can include many other features not described in detail herein. Additionally, some well-known structures or functions may not be shown or described in detail below, so as to avoid unnecessarily obscuring the relevant description. Some of the recurring terms are now defined.

The terms "connected" or "coupled" and related terms used throughout the description are used in an operational sense and are not necessarily limited to a direct physical connection or coupling. Thus, for example, two devices may be coupled directly, or via one or more intermediary media or devices. As another example, devices may be coupled in such a way that information can be passed there-between, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," and the like generally mean the particular feature, structure, or characteristic following the phrase is included in at least one implementation of the disclosed technology, and may be included in more than one implementation. In addition, such phrases do not necessarily refer to the same embodiments or different embodiments.

The term "communication network" may be any type of network known in the art, such as a local area network or a wide area network, such as the Internet, and may include a wireless network, such as a cellular network, a cloud network, a local wireless network, such as Wi-Fi and/or close-range wireless communications, such as Bluetooth and Bluetooth low energy, near field communications (NFC), a wired network, or any other such network, or any combination thereof. Accordingly, the network may include both wired and/or wireless communication technologies, including Bluetooth, Bluetooth low energy, Wi-Fi and cellular communication technologies like worldwide interoperability for microwave access (Wi-MAX), 3G, 4G, CDMA, digital subscriber line (DSL), etc., cloud computing technologies, as well as wired or fiber optic technologies. Additionally or alternatively, the communication network may be a mesh network. For example, in a wireless local area network (WLAN), network devices may be configured to receive and forward communications, which are ultimately destined for a different device. These types of networks are generically referred to as "mesh" networks, where network nodes may form a "mesh" of paths for which communications may travel to reach their destination. A mesh network is a network that employs one of two connection arrangements, full mesh topology or partial mesh topology. In the full mesh topology, each node is connected directly to each of the others. In the partial mesh topology, nodes are connected to only some, not all, of the other nodes. In connection with wireless networks, the term "mesh" is often used as a synonym for "ad hoc" or "mobile" network. As used herein, a wireless mesh network assumes a network that handles many-to-many connections and is capable of dynamically updating and optimizing these connections. The dynamic management of complex routing information, which likely includes information about external networks (e.g. the Internet and gateways to it), is considered in dynamic mesh protocols.

Wireless networks may use beacon transmissions to advertise the network's existence, as well as provide information about the network and capabilities associated with the network. Different kinds of beaconing mechanisms may be used, for example, one for infrastructure mode networks (also called basic service set (BSS) networks) and one for ad-hoc mode networks (also called independent basic service set (IBSS) networks). In infrastructure networks, access points (APs) are the entities responsible for generating beacons whereas in ad hoc networks, all network nodes (including user stations) participate in the generation of beacons. The ad hoc network beacons (referred to as IBSS beacons) are used to advertise the network (which consists of all the nodes) as a whole while the infrastructure network beacons (referred to as BSS beacons) are generated by an AP and meant to advertise the existence of only that individual AP. Components used for such communications can depend at least in part upon the type of network, the environment selected, or both. Protocols for communicating over such networks are well known and are not discussed herein in detail.

Additionally, as used herein, the term "payment card," "payment object," or "payment instrument" refers to a payment mechanism that includes a debit card, a credit card, a prepaid gift card, or the like, a smartcard that has an embedded integrated circuit chip (e.g., Europay-MasterCard-Visa (EMV) card), a proxy card, or any card that functions as a combination of any of these mechanisms. The term "proxy object" as used herein refers to a card that may or may not bear a card number/account number that appears to be that of a real credit or debit card account (i.e., it is in the correct format), but where that card/account number is actually only a proxy for the customer's real card/account number. Another type of payment object is a biometrically identifiable instrument, which may be initialized using a person's finger (e.g., for fingerprint recognition), face, iris or retina, heartbeat, etc. Alternatively, the payment object can be a software instrument or virtual instrument, such as a virtual wallet configured to initiate contactless payment transactions, e.g., a key fob, a mobile device having an RFID tag, etc. Other examples of payment object may also include a prepaid card, a gift card, a rewards card, a loyalty points card, a frequent flyer miles card, checks, cash, or in general, any kind of financial instrument that holds financial value or provides a promise to pay at a later time. Thus, a payment object transaction (also referred to as payment card transaction) may be any be a transaction where a merchant or a user swipes the user's credit card through a payment object reader in exchange for a product or service offered by the merchant.

The term "swipe" here refers to any manner of triggering a payment object reader to read data from a payment object, such as by dipping into, tapping, hovering, bringing in close contact or passing the payment object into or through a payment object reader.

The term "beacons" refer to devices that use direct radio signal communication to directly communicate information wirelessly to other devices using mid-range to short-range radio signal protocols. In other words, the wireless beacons can directly communicate using radio signals without interaction with any intermediary devices between the communicating devices. Furthermore, a device can communicate information using radio signals, e.g. a user identifier, to another device without the devices engaging in a pairing process that requires user input and without requiring explicit user authorization to communicate with another device. The direct radio signal communication functionality can be performed by any appropriate computing device, e.g. wristwatch, a mobile phone, a portable music player, a tablet computer, a laptop computer, a personal digital assistant, a smartphone, a keychain beacon, or another handheld or wearable mobile device to name a few examples. The radio signals emitted by the devices for such wireless communication can be part of any appropriate standard for mid-range to short-range radio communications having an operable range of at least 1 meter and up to about 50 meters, e.g., Bluetooth, Bluetooth 4.0, and BLE. Other techniques, such as geo-fencing or sensors using global positioning system (GPS), may also be used for location determination. The radio signals described in this specification can be any appropriate type of signal, e.g., a broadcast or advertiser signal that indicates presence of the device to nearby devices, or a connection signal that transmits data to a connected nearby device, to name a few examples. In this specification, a device can be said to be "nearby," "neighboring" or "proximate" if the device is within the operable range for performing direct radio signal communication with another user device. The neighboring or intermediate device, in some cases, is structurally and operationally similar to the payment beacon device or the customer device. For example, the neighboring device is configured to store and transmit a payment proxy of its own to devices requesting such information.

The term "logging in" or "checking in" may thus refer to the customer's action through a user application to indicate availability to conduct a payment transaction or to communication by the customer device of such an indication to the beacon or to the POS terminal, as the context requires. In essence, checking in constitutes a consent by the user to conduct a card-less transaction with the merchant. This consent differs from actual authorization of the transaction, which the customer would provide, e.g., verbally, upon learning the amount of the transaction.

The term "cause" and variations thereof, as used throughout this description, refers to either direct causation or indirect causation. For example, a computer system can "cause" an action by sending a message to a second computer system that commands, requests or prompts the second computer system to perform the action. Any number of intermediary devices may examine and/or relay the message during this process. In this regard, a device can "cause" an action even though it may not be known to the device whether the action will ultimately be executed or completed.

The term "component," "component" or "engine" refers broadly to general or specific-purpose hardware, software, or firmware (or any combination thereof) components. Components and engines are typically functional components that can generate useful data or other output using specified input(s). A component or engine may or may not be self-contained. Depending upon implementation-specific or other considerations, the components or engines may be centralized or functionally distributed. An application program (also called an "application") may include one or more components and/or engines, or a component and/or engine can include one or more application programs.

Furthermore, for the purposes of interpreting this specification, the use of "or" herein means "and/or" unless stated otherwise. The use of "a" or "an" herein means "one or more" unless stated otherwise. The use of "comprise," "comprises," "comprising," "include," "includes," and "including" are interchangeable and not intended to be limiting. Also, unless otherwise stated, the use of the terms such as "first," "second," "third," "upper," "lower," and the like do not denote any spatial, sequential, or hierarchical order or importance, but are used to distinguish one element from another. It is to be appreciated that the use of the terms "and/or" and "at least one of", for example, in the cases of "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

While certain devices, e.g., the payment object readers and POS terminals, are shown as including distinct components, this is merely for ease of illustration and not intended as limiting. In various implementations, the payment object readers and POS terminals may be identical, similar or distinct. Moreover, the components shown and described for the payment object readers and POS terminals may be implemented as more components or as fewer components and functions described for the components may be redistributed depending on the details of the implementation. Additionally, in some implementation, there may be several, hundreds, thousands, hundreds of thousands, or more, of the payment object readers and the POS terminals. Further, in some implementations, configuration, structure, and operational characteristics of the payment object readers and/or POS terminals may vary from device to device. In general, payment object readers and the POS terminals can each be any appropriate device operable to send and receive data, requests, messages, electronic messages, text messages, alerts, notifications, pop-up messages, push notifications, or other types of information over the one or more networks or directly to each other.

The cash tagging or beacon payment technology introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to cause one or more processors to perform the methods, variations of the methods, and other operations described here. The machine-readable medium may include, but is not limited to, floppy diskettes, optical discs, compact disc read-only memories (CD-ROMs), magneto-optical discs, read-only memories (ROMs), random access memories (RAMs), erasable programmable read-only memories (EPROMs), electrically erasable programmable read-only memories (EEPROMs), application-specific integrated circuits (ASICs), magnetic or optical cards, flash memory, or other type of media/machine-readable medium suitable for storing electronic instructions. Various embodiments will now be described in further detail with the help of one or more figures.

Turning now to the Figures, FIG. 1 is a block diagram illustrating embodiments of a payment processing system (PPS) controller 100 configured to allow processing of payment transactions between entities, such as a merchant and a customer, or a sender and recipient of funds. In one embodiment, the PPS controller 100 may serve to aggregate, process, store, search, serve, identify, instruct, generate, match, and/or facilitate interactions with a computer through various technologies, and/or other related data. The PPS controller 100 may be used to collect data for later retrieval, analysis, and manipulation, which may be facilitated through an internal or external database. For example, the PPS controller 100 on receiving payment related information may complete the transaction, generate receipt as proof of the transaction, update inventory of the product after the transaction, and obtain data related to the customer involved in the transaction, such as transaction history, location data, and the like. The PPS controller 100 can be a customer device (for example, a mobile phone of a customer), a merchant device (for example, a point-of-sale terminal for processing payment transactions), and a payment beacon to send and receive static or dynamic information, for example, the payment proxy, transaction summary or receipt, either perpetually or on activation. The devices may have fewer or more components than defined here as will be clear by context.

Users 102A, who may be customers, merchants, consumers, senders or recipients of funds, buyers, sellers, and/or other entities or systems, may engage information technology systems (e.g., computers, mobile devices, laptops, servers) to facilitate processing of information, such as transactional, financial, and so on. It should be noted that the term "server" as used throughout this application refers generally to a computer, other device, program, or combination thereof that processes and responds to the requests of remote users across a communications network. Servers serve their information to requesting "clients" 102B connected to the users 102A. The term "client" or "customer device" as used herein refers generally to a computer, program, other device, user and/or combination thereof that is capable of processing and making requests and obtaining and processing any responses from servers across a communications network 104. Networks 104 facilitate the transfer of information from source points to destinations. The users (e.g., merchants) may directly interact with the PPS controller 100, e.g., via the user inputs devices 105.

In one implementation, the PPS controller 100 can be configured to receive a payment card or payment card information to process payment card transactions (i.e., those involving reading of a payment card physically provided by the customer at the merchant's location), as well as card-not-present (CNP) transactions (i.e., those where the instrument is not physically presented at the time that the payment is effected, e.g., through payment proxy), either through a card reader 106 or by providing a graphical user interface 108 to accept financial account information of the user 102A initiating the payment. A payment card transaction may be any transaction where a merchant or a customer uses a payment card to purchase a product or service offered by the merchant, for example, by swiping a user's credit card through a card reader 106 or by providing the information through voice, text, or other wired or wireless data communication techniques. The term "swipe" here refers to any manner of triggering a card reader 106 to read data from a payment card, such as by passing a card into or through a magnetic stripe card reader, optical scanner, smartcard (card with an embedded IC chip) reader (e.g., an EMV-compliant card reader or NFC enabled reader), radio frequency identification (RFID) reader, or the like. Such card readers may either be integrated within the PPS controller 100 (as shown) or connected externally with the PPS controller 100 and/or client(s) 102B as peripheral devices 110. If the card reader 106 is connected externally, the peripheral devices 110 may be connected via wired or wireless communication network 104 and interact to each other through customized interfaces. In one implementation, the card reader 106 can be connected to an audio plug of the PPS controller 100. If the card reader 106 is integrated within the PPS controller 100, the one or more interfaces and components can be configured to accept payment data through various communication protocols. Accordingly, hardware implementation may include creation of slots, magnetic tracks, and rails with one or more sensors to facilitate a user 102A, e.g., a merchant, to detect and accept a payment card. In one implementation, the payment card and the peripheral devices 106 may support the same technology for short-range (typically less than 100 meters) and/or low power wireless communication protocols and technologies, such as Bluetooth Low Energy (BLE), standard Bluetooth, WiFi, Near Field Communication (NFC) or Radio-Frequency Identification (RFID). According to the communication protocol preferred or implemented, the PPS controller 100 may require additional steps to configure the card reader 106 to operate and work alongside the PPS controller 100. For example, a pairing component (described later) may be used to connect, synchronize, and pair the card reader 106 and the PPS controller 100 to facilitate exchange of data obtained off the payment card.

The term "payment card" or 'payment object' refers to a payment mechanism that includes a conventional debit card, a conventional credit card, a prepaid gift card, or the like, a smartcard that has an embedded integrated circuit chip (e.g., Europay-MasterCard-visa (EMV) card), a proxy card, or any card that functions as a combination of any of these mechanisms. The term "proxy card" as used herein refers to a card that may or may not have a card number/account number that appears to be that of a real credit or debit card account (i.e., it is in the correct format), but where that card/account number is actually only a proxy for the customer's real card/account number. The card/account number generally adheres to a naming standard set by the financial institution associated with or issuing the payment card. Other examples of payment card may also include a prepaid card, a gift card, a rewards card, a loyalty points card, a frequent flyer miles card, a check, cash, or any other kind of payment instrument that holds financial value or provides a promise to pay at a later time.

The payment card used in the example above is one type of a financial instrument. Other types of financial instruments, other than the payment card, can be used to initiate the transfer of funds. Another example of a financial instrument is a biometrically identifiable instrument, such as a person's finger (e.g., for fingerprint recognition), face, iris or retina, heartbeat, etc. Alternatively, a financial instrument can be a software instrument or virtual instrument, such as a virtual wallet, optionally embedded in a hardware device to enable contact or contactless payments.

PPS Controller Architecture

In one implementation, the PPS controller 100 may be based on computer systems that may comprise, but are not limited to, PPS units 112 and memory 114. Furthermore, PPS units can comprise hardware and/or software components, referred to as PPS units 112, which may comprise a central processing unit ("CPU(s)" and/or "processor(s) and/or microprocessor(s)" (these terms are used interchangeably)) 116 and an interface bus 118, which may be interconnected and/or communicating through a system bus 120 on one or more motherboard(s) having conductive and/or otherwise communicative pathways through which instructions (e.g., binary encoded signals) may travel to enable communications, operations, storage, etc. The interface bus 118 may also include other interfaces or adapters specific to network, storage, peripherals, and input-output interface(s), through which data may pass into and out of a computer and which allow users to access and operate various system components. The interface bus 118 may be connected to external units, such as peripheral devices 110 or client(s) 102B via communication network 104. Each of the PPS components 112 is now described in detail.

Processor(s)

The CPU 116 may incorporate various specialized processing units, such as, but not limited to: integrated system (bus) controllers, memory management control units, floating point units, and even specialized processing sub-units like graphics processing units, digital signal processing units, and/or the like. In various embodiments, the processor core may be a low-power/ultra-low power/low-cost microcontroller; examples include an Intel Processor like Intel Atom, Apple A4, NVidia Tegra 2, Marvell Armada, Qualcomm Snapdragon, Samsung Hummingbird and Exynos, Texas Instruments OMAP and MSP microcontroller, ARM Holdings processor like the Cortex-A, -M -R, Series, or ARM series and/or the like processor(s). Should processing requirements dictate a greater amount speed and/or capacity, distributed processors (e.g., Distributed PPS), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the PPS controller 100 may be achieved by implementing a microcontroller, such as Freescale's Kinetis K21D; and/or the like. Also, to implement certain features of the PPS controller 100, some feature implementations may rely on embedded components, such as: Application-Specific Integrated Circuit ("ASIC"), Digital Signal Processing ("DSP"), Field Programmable Gate Array ("FPGA"), and/or the like embedded technology. Depending on the particular implementation, the embedded components may include software solutions, hardware solutions, and/or some combination of both hardware/software solutions.

Interface Bus and Adapters

Interface bus(ses) 118 may accept, connect, and/or communicate to a number of interface adapters, although not necessarily in the form of adapter cards, such as but not limited to: input-output interfaces (I/O) 122, storage interfaces 124, network interfaces 126, and/or the like. Optionally, cryptographic processor interfaces 128 may be connected to the interface bus 118.

Storage interfaces 124 may accept, communicate, and/or connect to a number of storage devices such as, but not limited to: storage devices 130, removable disc devices, and/or the like. Storage interfaces 130 may employ connection protocols such as, but not limited to: (Ultra) (Serial) Advanced Technology Attachment (Packet Interface) ((Ultra) (Serial) ATA (PI)), (Enhanced) Integrated Drive Electronics ((E) IDE), fiber channel, Small Computer Systems Interface (SCSI), Universal Serial Bus (USB), and/or the like.

Input-Output interfaces (I/O) 122 may accept, communicate, and/or connect to user input devices 105, peripheral devices 110, such as externally connected card readers, cryptographic processor devices 131, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); USB 2.0; USB 3.1; USB Type C; Ethernet; infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA (+)), high-speed downlink packet access (HSDPA), global system for mobile communications (GSM), long term evolution (LTE), WiMax, Li-Fi etc.); and/or the like. In various embodiments, an audio or video display with a touch screen and driver may be included, the touch screen being based upon a variety of later-developed or current touch screen technology including resistive displays, capacitive displays, optical sensor displays, electromagnetic resonance, or the like. Additionally, touch screen display may include single touch or multiple-touch sensing capability. Any display technology may be used for the output display, such as a Liquid Crystal Display (LCD) or solid state device such as light-emitting diode (LED) or organic light-emitting diode (OLED), Plasma display, trans-reflective (Pixel Qi) display, electronic ink display (e.g. electrophoretic, electrowetting, interferometric modulating). In various embodiments, the resolution of such displays and the resolution of such touch sensors may be set based upon engineering or non-engineering factors (e.g. sales, marketing). In some embodiments, speakers and LED indicators can be used to present audio and visual identifiers of transaction and device status. In addition, buttons may be configured to power PPS controller 100 on or off, operate the controller or reset the controller 100.

In some embodiments of the PPS controller 100, image capture device may be included, which may further include a sensor, driver, lens and the like. The sensor may be based upon any later-developed or convention sensor technology, such as CMOS, CCD, or the like. Image recognition components may be provided to process the image data. For example, such components can support functionalities including, but not limited to, barcode detection, facial recognition, camera parameter control, etc.

Network interface(s) 126 may be regarded as a specialized form of an input-output interface. One or more network interfaces 126 may be used to engage with various communications network types 104. For example, multiple network interfaces may be employed to allow for the communication over broadcast, multicast, and/or unicast networks. Through a communications network 104, the PPS controller 100 is accessible through remote clients 102B (e.g., computers with web browsers) by users 102A. Network interfaces 126 may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed PPS), architectures may similarly be employed to pool, load balance, and/or otherwise increase the communicative bandwidth required by the PPS controller 100.

In some implementations, the network interfaces 126 may be communicatively coupled to hardware components, which facilitate detection of payment cards. For example, the network interfaces 126 may couple to a payment card slot or rail designed to accept payment cards through swipe or insertion or any other action. In another example, the network interfaces 126 may couple to one or more sensors included to detect presence of payment card or a tap of the payment card onto a surface of the PPS controller 100.

In various embodiments, the network interface 126 may also support wireless data transfers between the PPS controller 100 and external sources, such as clients 102B and cameras, or the like. Wireless protocols may include Wi-Fi (e.g. IEEE 802.11a/b/g/n, WiMax), Bluetooth or Bluetooth low energy (BLE); infrared, and the like, through BLE interface, WiFi interface, QR interface, NFC interface, EMV interface, cellular technology interface, and other interface(s), described subsequently.

According to one implementation, BLE interface ("BLE") 132 is configured to work on Bluetooth® or BLE® protocol to facilitate communication with a BLE transceiver installed on other devices. In one implementation, BLE is intended for low-power and low-latency applications for wireless devices within a short range, such as up to about 50 meters. BLE interface 132 may be used in applications requiring intermittent communications, smaller amounts of data transfer and bandwidths, and/or low duty cycles. BLE interface 132 can be configured to use only a fraction of the power as compared to other interfaces. In many cases, BLE interface 132 may be able to operate more than a year on the power source without charging.

BLE interface 132 is capable of being paired with a peripheral device, such as card reader 106, a payment card, or a client 102B associated with a user 102A, thus allowing the PPS controller 100 to (a) serve as a "beacon" and broadcast data and/or (b) become a relay point between the controller 100 and payment card, card reader 106 or a client 102B serving as a point of sale terminal for a merchant. The BLE interface 132 allows the controller 100 with BLE interface 132 can be placed at merchant locations, museums, ski resorts, state parks, entertainment venues, parking garages, etc.

As defined herein, a beacon is a short range communication device having a known or fixed location that provides a signal that can be detected by mobile devices within proximity of the beacon. For example, BLE interface 132 can transmit a radio frequency (RF) signal that includes its position coordinates (e.g., latitude, longitude), which can be detected by a mobile device. Alternatively, BLE interface 132 can transmit other data, such as payment proxy related to the financial account information of the user 102B (explained with reference to FIGS. 4-6).

PPS controller 100 as BLE beacon allows for constant, scheduled or random scanning of other Bluetooth peripherals and devices. In one implementation, a component, such as BLE interface component, within the PPS controller 100 and/or the client 102B can be set to run in the background under a BLE protocol, persistently, intermittently or on activation monitoring for a significant change in location and/or presence of an appropriate BLE peripheral or beacon at a merchant or vendor location. BLE beacon also allows for persistent or intermittent transmission of data. For example, BLE beacon may persistently transmit or receive information related to payment proxy associated with the client 102B or PPS controller 100.

When the owner or user of the client 102B or payment card enters a store having PPS controller 100 as a point of sale terminal, he or she would get in the BLE network radius of the PPS controller 100. PPS controller 100 then serves as a bidirectional conduit for the card reader 106 to communicate with the CPU 124 collecting or handling the credit card transaction. Along with receiving transaction data or any other data by the BLE interface 132, the PPS controller 100 may also encrypt, decrypt, or store the data for future processing. It does these actions in addition to running the payment application itself, which may display items for sale, up-sell based on purchases, allow confirmation of purchases, application of coupons, the ability to provide feedback, etc.

In one implementation, the PPS controller 100 or the client 102B may be connected to a BLE peripheral device having BLE interface 132 functionalities. In some implementations, the payment card may include a chip supporting BLE functionalities. A control logic unit (not shown) may also be included to bridge BLE interface either to ISO 7816 contact interface or ISO 14443 contactless interface to provide for autonomous bi-directional data transfer between paired devices. In one implementation, the controller 100 is capable of communicating using Bluetooth, and is thus able to pair with a peripheral device 110 to obtain payment object information from a phone that at least has Bluetooth capabilities. In one implementation, a plurality of BLE peripheral devices may be connected via the BLE protocol, or other communication network, to form a mesh network. Such a mesh network may allow for transfer of data between the peripheral devices, even those that are more than the distance prescribed by the BLE protocol.

Similar to BLE beacons, data can be exchanged using other kind of RF beacons, infrared beacons, cellular communications (CDMA, GSM, LTE, etc.), beacons, pattern generation beacons, such as barcodes, Quick Response (QR) codes, or a radio frequency identifier (RFID) tag. QR code or NFC may have short range but high accuracy; WiFi or Bluetooth may have mid-range and medium accuracy; and cellular may have long-range but low accuracy. In some embodiments, the controller 100 can receive and permanently store payment information so that the controller 100 acts as a payment object that does not require a payment card or other payment object to be present.

In one example, an NFC interface 134 ("NFC") can allow for close range communication using standards such as ISO 18092, ISO 21481, TransferJet® protocol and in compliance with FIME certifications. Close range communication with the NFC interface may take place via magnetic field induction, allowing an NFC interface chip 134 to communicate with other NFC devices or to retrieve information from tags having RFID circuitry via the NFC interface. In instances where it is desired to read an NFC enabled payment object, or an NFC enabled payment object is determined to be in proximity to the card reader 106, the CPU 116 may be configured to drive antenna 145 via a driving circuit (not shown) to induce a magnetic field capable of being modulated by the NFC enabled payment object. From here, the modulated magnetic field signal may be converted into a digital signal that CPU 116 can interpret via the NFC component 172. On the other hand, when it is desired to transmit data via antenna 145, CPU 116 may be configured to disable the driving circuit and transmit data using the NFC protocol by instructing a NFC modulator (not shown) to modulate the magnetic field to which antenna 145 is operatively coupled. In some embodiments, there can be a switch within the NFC modulator to turn on or off the load applied to the antenna 145. The switch can be under the control of the CPU 116. In some embodiments the antenna 145 can drift from a desired frequency (become detuned). This can be the result of a metal object being in the proximity of device 110 or controller 100. The monitor circuit (not shown) can monitor the frequency of the antenna 145, and determine when the frequency of the antenna 145 has drifted away from the desired frequency. When the it is determined that the NFC antenna 145 is out of tune, NFC antenna monitor circuit can work in concert with the CPU 116 to vary one or parameters such as capacitance, voltage, or impendence of the antenna 145 to tune the NFC antenna 145.

In another example, an EMV interface 136 ("EMV") can allow the PPS controller 100 to accept Chip and PIN cards follow technical standards more formally known as EMV, after Europay, MasterCard and Visa (EMV). In one implementation, the EMV interface complies with EMV's Level 1, Level 2 and Level 3 certifications. In some instances, CPU 116 receives payment data read by the EMV interface 136 via the card contacts (not shown), or alternatively from a magnetic stripe reader reading payment data from a magnetic stripe card. The payment data received at the CPU 116 is stored, either temporarily or permanently, in memory 114 of the controller 100. The payment data stored in memory can then be transmitted via the NFC antenna 218. The network interfaces 126 may work in conjunction with components explained later.

In other implementations, a plurality of beacon technologies may be used based on specific accuracy or power requirements. Such technologies may be combined based on weight or some other relationship. In yet another implementation, selections may be made based on user preference or availability of the beacon technology at that time. For example, the PPS controller 100 may be configured to provide and detect a plurality of beacons. For example, if a camera is on, a QR code on the client 102B display may be read, for example to pair two payment devices. If only cellular is on, a modem may detect a femtocell may be nearby. The client 102B, such as a merchant's register or point of sale terminal, may combine data from the multiple beacons and use such data for analysis of transactions over a course of time. For example, the customer device 102B may be configured to use Wi-Fi RSSI/RTT and BT RSSI/

RTT measurements from a first beacon, QR code value from a second beacon, and WiFi RSSI and cellular measurements from a third beacon for accurately identifying and establishing secured connections with the customer device 102B.

The beacons can be dynamic with data and other beacon parameters changing as per environment or the type of device pairing with the PPS controller 100; in other implementations, the beacons can be static and displayed using LED displays, electronic displays, or the like, described with reference to I/O interface.

In one embodiment, the PPS controller 100 may also be connected to and/or communicate with entities such as, but not limited to: one or more users, for example users 102A, associated with user input devices 105; one or more users 102A through their respective customer devices 102B; peripheral devices 110; an internal or external cryptographic processor device 131; and/or a communications network 104.

Communications Network

The network 104 can include any combination of local area and/or wide area networks, using both wired and wireless communication systems. In some embodiments, the network 104 uses standard communications technologies and/or protocols. Thus, the network 104 can include links using technologies such as Ethernet, 802.11, a Wi-Fi, a Bluetooth network; and/or the like worldwide interoperability for microwave access (WiMAX), 3G, 4G, CDMA, digital subscriber line (DSL), etc. Similarly, the networking protocols used on the network 108 may include multiprotocol label switching (MPLS), transmission control protocol/Internet protocol (TCP/IP), hypertext transport protocol (HTTP), and/or file transfer protocol (FTP). Data exchanged over the network 108 can be represented using technologies and/or formats including hypertext markup language (HTML) or extensible markup language (XML). In addition, all or some links can be encrypted using conventional encryption technologies such as secure sockets layer (SSL), transport layer security (TLS), and Internet Protocol security (IPsec). Additionally, the communication network may be a mesh network. For example, in a wireless local area network (WLAN), network devices may be configured to receive and forward communications which are ultimately destined for a different device. These types of networks are generically referred to as "mesh" networks, where network nodes may form a "mesh" of paths for which communications may travel to reach their destination. Wireless networks may use beacon transmissions to advertise the network's existence, as well as provide information about the network and capabilities associated with the network. Different kinds of beaconing mechanisms may be used, for example, one for infrastructure mode networks (also called basic service set (BSS) networks) and one for ad-hoc mode networks (also called independent basic service set (IBSS) networks). In infrastructure networks, access points (APs) are the entities responsible for generating beacons whereas in ad hoc networks, all network nodes (including user stations) participate in the generation of beacons. The ad hoc network beacons (referred to as IBSS beacons) are used to advertise the network (which consists of all the nodes) as a whole while the infrastructure network beacons (referred to as BSS beacons) are generated by an AP and meant to advertise the existence of only that individual AP.

Clock

Clock 138 may have a crystal oscillator that generates a base signal through the PPS controller's circuit pathways. The clock 138 may be coupled to the system bus 120 and various clock multipliers that increase or decrease the base operating frequency for other components interconnected in the PPS controller 100.

Power Source

The PPS units 112 may also include a power source 140. The power source 140 may be of any form capable of powering small electronic circuit board devices such as the following power cells or batteries: alkaline, lithium hydride, lithium ion, lithium polymer, nickel cadmium, solar cells, and/or the like. Other types of AC or DC power sources may be used as well. The power source 140 is connected to at least one of the interconnected subsequent components of the PPS controller 100 thereby providing an electric current to all subsequent components. In one example, the power source 140 is connected to the system bus 104. In an alternative embodiment, an outside power source 140 is provided through a connection across the I/O 122 interface. For example, a USB connection can carry both data and power across the connection and is therefore a suitable source of power. To this end, coupled to power source 140 may be a USB micro interface (not shown) configured to receive a USB micro jack, although other types of connectors are anticipated. In certain embodiments, connection of a jack to USB micro interface can activate a switch within power source 140 to override power supplied by the battery. This allows for battery power to be conserved for situations where external power cannot be provided. Furthermore, power source 140 may also include a battery charger to allow the battery to be charged when external power is supplied via USB micro interface.

In one implementation, the power source 140 may include a selector (not shown) to selectively power one or more units within the PPS controller 100. For example, the power source 140 may power the BLE network interface and BLE component and power the CPU 116 only on receiving a wake up signal, using an activation signal, triggered by a tactile, visual, or audio input. To this end, the PPS controller 100 may include wake-up electronics (not shown) configured to wake-up the PPS controller 100 from a low-power state to an active state in response to detection of a payment object. In some embodiments, wake-up electronics can also power down PPS controller 100 to a low-power state after a predetermined amount of time or after completion of a communication.

Cryptographic Processor

A cryptographic processor 142 and/or transceivers (e.g., ICs) 144 may be connected to the system bus 120. In another embodiment, the cryptographic processor and/or transceivers may be connected as either internal and/or external peripheral devices 110 via the I/O interface bus 122. To this end, the transceivers 144 may be connected to antenna(s) 145, thereby enabling wireless transmission and reception of various communication and/or sensor protocols. For example the antenna(s) may connect to a transceiver chip or a wireless microcontroller targeting Bluetooth applications, e.g., providing 802.11n, Bluetooth 4.2, Bluetooth 2.1+EDR, FM, GSM/EDGE/GPRS/2G/3G/HSDPA/HSUPA/LTE (4G) communications, global positioning system (GPS) thereby allowing PPS controller 100 to determine its location, for example. A separate GPS unit 146 (also referred to as the location component) may be used to determine the location of a merchant or customer performing a payment transaction using a payment card. The GPS unit may work on any of the protocols mentioned above. The location information may be used to advertise location specific information to the user.

Furthermore, the communicative instructions may be stored and/or transmitted in batches (e.g., batches of instructions) as programs and/or data components to facilitate desired operations.

Peripheral Devices

Peripheral devices 110 may be connected and/or communicate to I/O interface 122 and/or other facilities of the like such as network interfaces, storage interfaces, directly to the interface bus 118, system bus, the CPU, and/or the like. Peripheral devices 110 may be external, internal and/or part of the PPS controller 100. Peripheral devices 110 may include: antenna, audio devices (e.g., line-in, line-out, microphone input, speakers, etc.), cameras (e.g., still, video, webcam, etc.), dongles (e.g., for ensuring secure transactions with a digital signature, and/or the like), external processors (for added capabilities; e.g., crypto devices 131), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like.

A card reader, similar to card reader 106, may be connected to the PPS controller 100 as a peripheral device. The card reader may comprise user interfaces, such as, for example, a PC/SC EMV L1/L2/NFC certified Smart Card Reader, a keypad for PIN entry, such as key keypad, a display, such as the illustrated LCD display, etc., and electrical interfaces, an interface for back-up battery power, an interface for a display, a power interface, LED lights for indicating status of a transaction, a buzzer, etc. The card reader may be, for example, PCI v3 compliant and configured to facilitate the acceptance of credit/debit card payments.

Peripheral devices 110 may also include sensors, devices, and subsystems can be coupled to network interface to facilitate multiple functionalities. For example, motion sensor, magnetic, light sensor, and proximity sensor can be coupled to network interface to facilitate orientation, detection, lighting, and proximity functions of the PPS controller 100, by analyzing any input, such as audio, visual, tactile, mechanical, electrical, magnetic, hydraulic, electromagnetic input, and the like. Location processor (e.g., GPS receiver similar to GPS 146) can be connected to the network interface to provide geo-positioning. Motion sensor can include one or more accelerometers configured to determine change of speed and direction of movement of the PPS controller 100. Magnetic sensors may detect presence or absence of a payment card and differentiate a payment card from other cards.

Peripheral devices 110 may also include a camera subsystem and an optical sensor, e.g., a charged coupled device (CCD) or a complementary metal-oxide semiconductor (CMOS) optical sensor, can be utilized to facilitate camera functions, such as recording photographs and video clips.

Peripheral devices 110 may also include an audio subsystem can be coupled to a speaker and a microphone to facilitate voice-enabled functions, such as voice recognition, voice replication, digital recording, and telephony functions. Audio subsystem can be configured to receive voice commands from the user.

Peripheral devices 110 may also include an I/O subsystem that can include touch surface controller and/or other input controller(s). Touch surface controller can be coupled to a touch surface or pad. Touch surface and touch surface controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch surface. Touch surface can include, for example, a touch screen.

Other input controller(s) can be coupled to other input/control devices, such as one or more buttons, rocker switches, thumb-wheel, infrared port, USB port, and/or a pointer device such as a stylus. The one or more buttons (not shown) can include an up/down button for volume control of speaker and/or microphone.

In one implementation, a pressing of the button for a first duration may disengage a lock of the touch surface; and a pressing of the button for a second duration that is longer than the first duration may turn power to PPS controller 100 on or off. The user may be able to customize a functionality of one or more of the buttons. The touch surface can, for example, also be used to implement virtual or soft buttons and/or a keyboard. The touch surface may also activate the PPS controller to actively relay information. At all other times, the PPS controller 100 may be dormant to conserve power.

User input devices 105 often are a type of peripheral device 110 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like. The card readers, as mentioned before, may be configured to read a variety of payment cards. Such card readers may either be dongle like or puck style.

Cryptographic units such as, but not limited to, microcontrollers, processors 116, interfaces 118, and/or devices 131 may be attached, and/or communicate with the PPS controller 100. Cryptographic units support the authentication of communications from interacting agents, as well as allowing for anonymous transactions. Cryptographic units may also be configured as part of the CPU.

It should be noted that although user input devices 105 and peripheral devices 110 may be employed, the PPS controller 100 may be embodied as an embedded, dedicated, and/or monitor-less (i.e., headless) device(s), wherein access would be provided over a network interface connection. Additionally, part or all peripheral devices may be integrated within the PPS controller 100.

Memory

Memory 114 may further include, but is not limited to, one or more components 148 that include programs that supplement applications or functions performed by the PPS controller 100, database 150, operating system 152, random access memory (RAM) 154, read only memory (ROM) 156, and storage device 130, etc., into which data may be saved that serves, amongst other things, as repository for storing data pertinent to functioning of the components.

The PPS controller 100 may employ various forms of memory 114, such as ROM 156, RAM 154, and a storage device 130. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like.

PPS Components

The memory 114 may contain a collection of program and/or database components and/or data such as, but not limited to: operating system component(s) 152 (operating system); information server component(s) 158 (information server); user interface component(s) 108 (user interface); Web browser component(s) 160 (Web browser); database(s) 150; cryptographic server component(s) 162 (cryptographic server); the pairing component(s) 164; and/or the like (i.e., collectively a component collection). These PPS components 148 may be stored and accessed from the storage devices and/or from storage devices accessible through an interface bus 118.

Operating System

The operating system component 152 is an executable program component facilitating the operation of the PPS controller 100. The operating system can facilitate access of I/O, network interfaces, peripheral devices, storage devices, and/or the like. In various embodiments, any number of current or future operating systems may be supported such as: any highly fault tolerant, scalable, portable, ROM-able, real-time, deterministic, multitasking and secure kernels systems, e.g., µC/OS-III, µC/OS-III, Apple Macintosh OS X (Server); Unix and Unix-like system distributions; Linux distributions; limited and/or less secure operating systems, e.g., AppleMacintoshOS, Microsoft Windows XP, Windows Server2003, Windows Server 2008, Windows Server2012, Windows Vista®, Windows 7, and Windows 8, Blackberry OS (e.g., Blackberry 10), Firefox OS, Sailfish OS, Tizen, Ubuntu Touch OS, Chrome OS, iPhone OS (e.g. iOS), WindowsMobile (e.g. Windows 10 Mobile), Google Android (e.g. Lollipop 5.1); and/or the like. In various embodiments of the present subject matter, the operating system may be a multi-threaded multi-tasking operating system. Accordingly, inputs and/or outputs from and to a display and inputs/or outputs to physical sensors may be processed in parallel processing threads. In other embodiments, such events or outputs may be processed serially, or the like. Inputs and outputs from other functional blocks may also be processed in parallel or serially, in other embodiments, such as image acquisition device and physical sensors.

The operating system 152 may provide communications protocols that allow the PPS controller 100 to communicate with other entities through a communications network 113. Various communication protocols may be used by the PPS controller 100 as a subcarrier transport mechanism for interaction, such as, but not limited to: multicast, TCP/IP, UDP, unicast, and/or the like.

Information Server

The information server 158 may: support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols; provide results in the form of Web pages to Web browsers; and allows for the manipulated generation of the Web pages through interaction with other program components.

Web Browser

A Web browser component 160 is a stored program component that is executed by a CPU. The Web browser may be a hypertext viewing application such as Google Chrome or Macintosh Safari. Web browsers and like information access tools may be integrated into PDAs, cellular telephones, and/or other mobile devices. Also, in place of a Web browser and information server, a combined application may be developed to perform similar operations of both.

The combined application would similarly affect the obtaining and the provision of information to users, user agents, and/or the like from the PPS enabled nodes. The web browser may be coupled to a web server (not shown). In other implementations, the PPS controller 100 may host a website (hereinafter, "system website") that includes one or more graphical user interfaces (GUIs) for organizing and presenting content to users. For example, through the system website, users create account logins to connect to their social identities (e.g., social profiles or social accounts), read content (e.g., messages, comments, posts), create or post content, communicate in real-time with other users (e.g., chat), and/or otherwise engage or interact with other users of the system website (e.g., "friends," "followers," "social contacts," or other types of social network connections). In some embodiments, the user interactions on the system website lead to internal API communication, which involves the PPS controller 100 monitoring the user interactions for an indication of an intent to transfer money, sending, in response to such indication, requests (e.g., POST or GET requests) to the API of the server(s) to query the database(s) 150, and displaying the data returned by the API of the server(s) as appropriate. The indication of the intent is determined may be based on an identification of a user input, e.g., a string of characters, that has a particular syntax, the syntax being a monetary indicator preceding one or more alphanumeric characters. The user input having the syntax operates as a trigger to send money to a payment proxy represented by the user input.

User Interface

The user interface 108 may allow for the display, execution, interaction, manipulation, and/or operation of program components and/or system facilities through textual and/or graphical facilities through one or more interaction interface elements, such as check boxes, cursors, menus, scrollers, and windows (collectively and commonly referred to as widgets) to facilitate the access, capabilities, operation, and display of data and computer hardware and operating system resources, and status. Graphical user interfaces (GUIs) 108 may be used to provide a baseline and means of accessing and displaying information graphically to users. The user interface may also be a graphic user interface as provided by, with, and/or atop operating systems and/or operating environments such as already discussed.

Cryptographic Server

A cryptographic server component 162 is a stored program component that is executed by a CPU 116, cryptographic processor 142, cryptographic processor interface 128, cryptographic processor device 131, and/or the like, to enable encryption schemes allowing for the secure transmission of information across a communications network to enable the PPS components to engage in secure transactions. The cryptographic server 162 facilitates the secure accessing of resources on the PPS and facilitates the access of secured resources on remote systems; i.e., it may act as a client and/or server of secured resources. Cryptographic processor interfaces 128 can allow for expedition of encryption and/or decryption requests by the cryptographic component. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Secure Socket Layer (SSL), Secure Hypertext Transfer Protocol (HTTPS), and/or the like. Employing such encryption security protocols, the PPS controller 100 may encrypt all incoming and/or outgoing communications.

PPS Database

The PPS database component 150 may be a fault tolerant, relational, scalable, secure database, such as Oracle or Sybase. Alternatively, the PPS database 150 may be implemented using various data-structures, such as an array, hash, (linked) list, struct, structured text file (e.g., XML), table, and/or the like. Such data-structures may be stored in memory and/or in structured files. In another alternative, an object-oriented database may be used. Also, the database may be implemented as a mix of data structures, objects, and relational structures.

In one embodiment, the database 150 includes several data tables 150a-f. A payment proxy table 150a includes fields such as, but not limited to: payment proxy, payment proxy financial account, payment proxy last used, payment proxy transaction history, payment proxy contact list, and/or the like. The payment proxy data table may receive, send and/or track incoming and outgoing payment proxies. A location data table 150b includes fields such as, but not limited to: location of the PPS controller, location of clients 102B, coupons at the location, distance between the client 102B and the PPS controller 100, and/or the like. A transaction data table 150c includes fields such as, but not limited to: transaction information, purchases made, purchase history, price of the product, and/or the like.

A payment data table 150d includes fields such as, but not limited to: payment data received from the user 102A, payment card information, amount charged to the payment card, manner of receiving payment card (swipe, tap, etc.), offline/online mode, etc. A sensor data table 150e includes fields such as, but not limited to: payment card detected, payment card received, beacon activated, beacon deactivated, etc. The other data table 150f stores any other data generated by the PPS component(s) 148. For example, routing tables for communicating in a mesh network.

In one embodiment, specific tables may be created when each of the components are executed. Furthermore, the tables may be stored temporarily or permanently in the database 150.

PPS Components

The PPS component(s) 148 is a stored program component that is executed by the CPU 116. In one embodiment, the PPS component 148 incorporates any and/or all combinations of the aspects of the PPS controller 100 that was discussed in the previous figures. As such, the PPS controller 100 affects accessing, obtaining and the provision of information, services, transactions, and/or the like across various communications networks.

Examples of PPS components include, but are not limited to, pairing component(s) 164, QR code component(s) 166, transaction component(s) 168, BLE interface component(s) 170, EMV interface component 171, NFC interface component(s) 172, address mapping component(s) 174, and other component(s) 176. The pairing component 164 may facilitate pairing the PPS controller 100 with one or more software applications and/or external devices, such as customer phones, customer laptops, keyboard, mouse, other point of sale terminals, processing servers, etc. The QR code component 166 may allow and enable the PPS controller 100 to accept QR code as images for pairing hardware and/or software applications, and exchanging data and/or signals. The transaction component 168 may allow and enable the PPS controller 100 to accept transaction data, e.g., from a debit card or credit card, and process or transfer the transaction data to an external server, such as a payment processing system and financial network system, to obtain financial account information of users to fulfill a transaction. The BLE interface component(s) 170 and NFC interface component(s) 172 may allow and enable the PPS controller 100 to pair hardware and/or software applications, and exchanging data and/or signals via Bluetooth, BLE, and NFC technologies. The EMV interface component 171 allows and enabled the PPS controller 100 to accept payments from chip and/or PIN cards. The address mapping component(s) 174 may allow and enable the PPS controller 100 to map the payment proxies with financial accounts of merchants or customer profiles. The address mapping component 174 may also allow the PPS controller 100 to generate a dynamic payment proxy based on a changing parameter, such as user profile, time of day, location, etc. The other component(s) 176 may enable and allow processing of data/signals required by the PPS controller 100.

The structure and/or operation of any of the PPS controller 100 components may be combined, consolidated, and/or distributed in any number of ways to facilitate development and/or deployment. To this end, one may integrate the components into a common code base or in a facility that can dynamically load the components on demand in an integrated fashion. The components may be consolidated and/or distributed in countless variations through standard data processing and/or development techniques. Multiple instances of any one of the program components may be instantiated on a single node, and/or across numerous nodes to improve performance through load-balancing and/or data-processing techniques. Furthermore, single instances may also be distributed across multiple controllers and/or storage devices; e.g., databases.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D) COM), (Distributed) Object Linking and Embedding ((D) OLE), and/or the like), Common Object Request Broker Architecture (CORBA), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components. The grammar syntax itself may be presented as structured data that is interpreted and/or otherwise used to generate the parsing mechanism. Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

Figure 2A:
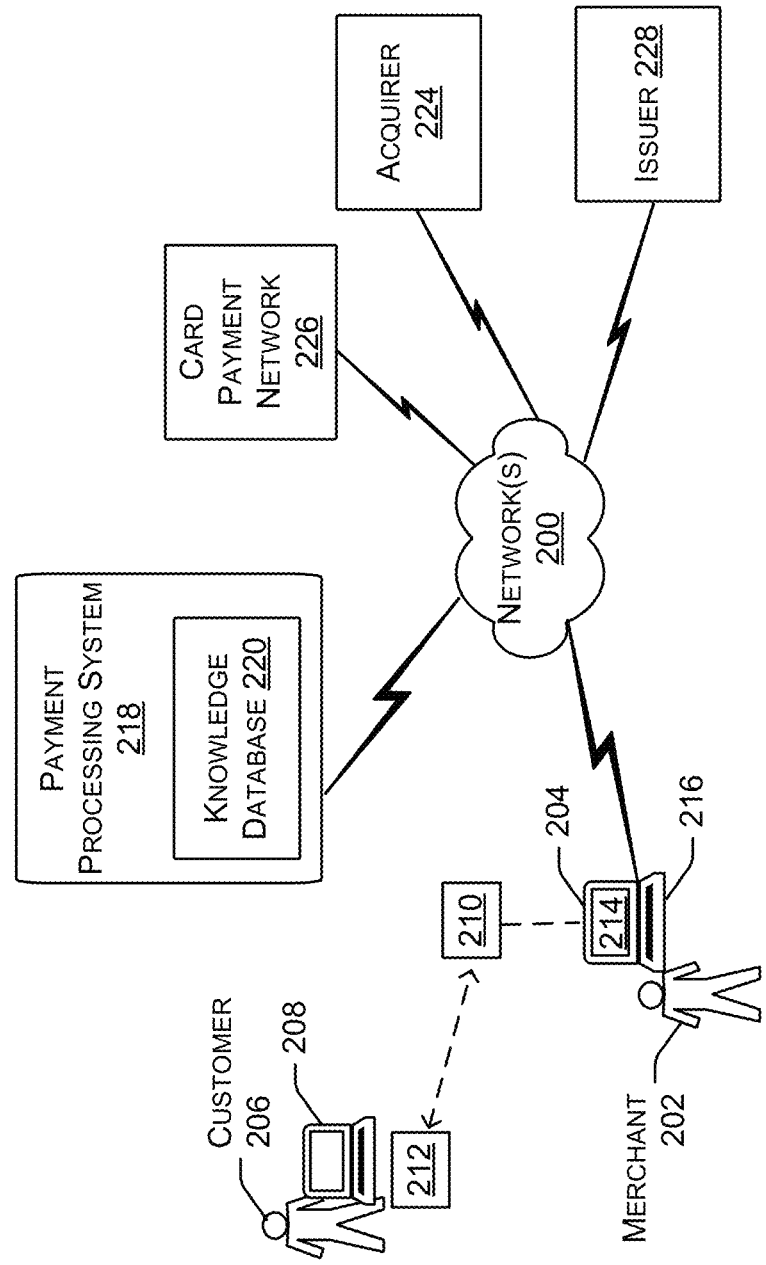
FIG. 2A is a data flow diagram illustrating movement of data and funds between one or more entities in the context of a payment transaction, according to an embodiment of the present subject matter.

FIG. 2A is a payment network illustrating movement of data and/or funds between one or more entities, according to an embodiment of the present subject matter. In one implementation, the payment network 200 may include: one or more merchants 202; one or more computing device(s) 204 associated with the merchants 202 ("merchant computing device 204"); customers 206 (also referred to as "user" or "consumer"); and one or more computing device(s) 208 associated with the customers 206 ("customer computing device 208"). The customers 206 and merchants 202 interact with each other via their respective computing devices to purchase one or more products or services. The merchant computing device 204 or customer computing device 208 can be, for example, a point-of-sale terminal, a desktop computer, a handheld device, a network computer, a laptop, tablet or other portable computer, a mobile phone, a landline phone, or any other form of processing device. In one implementation, the devices 204 and 208 may be implemented with components and components as described in FIG. 1. As such, the devices 204 and 208 may include or be associated with a card reader 210 (integrated card reader or an external card reader, for example similar to card reader 106), which is configured to receive a payment object, such as payment card 212, or payment card information to process payment card transactions (i.e., those involving reading of a payment card 212 physically provided by the customer at the merchant's location), as well as card-not-present (CNP) transactions (i.e., those where the instrument is not physically presented at the time that the payment is effected). The differentiation between "present" and "not-present" payment cards is that the likelihood of fraud against "not-present" payment card transactions is higher, and accordingly, interchange fee for "not-present" is higher than those levied for "present" payment card transactions. Additionally, the card reader 210 can process both contact and contactless payment transactions. The processing of payment cards physically presented at a merchant's location is discussed first.

A payment card transaction may be any transaction where a merchant 204 or a customer 208 uses a payment card 212 to purchase a product or service offered by the merchant 204. The term "payment card" or "payment object" refers to a payment mechanism that includes a conventional debit card, a conventional credit card, a prepaid gift card, or the like, a smartcard that has an embedded integrate circuit chip (e.g., Europay-MasterCard-visa (EMV) card), a proxy card, or any card that functions as a combination of any of these mechanisms. The term "proxy card" as used herein refers to a card that may or may not bear a card number/account number that appears to be that of a real credit or debit card account (i.e., it is in the correct format), but where that card/account number is actually only a proxy for the customer's real card/account number. Additionally, the payment card used in the example above is a specific type of a financial instrument. Other types of financial instruments, other than the payment card, can be used to initiate the transfer of funds. For example, a payment proxy having a syntax of a monetary indicator followed by alphanumeric data, where the proxy represents the financial account or is registered to the financial account in the payment processing system. Another type of payment object is a biometrically identifiable instrument, which may be initialized using a person's finger (e.g., for fingerprint recognition), face, iris or retina, heartbeat, etc. Alternatively, a financial instrument can be a software instrument or virtual instrument, such as a virtual wallet. Other examples of payment card 212 may also include a prepaid card, a gift card, a rewards card, a loyalty points card, a frequent flyer miles card, a check, cash, or any other kind of payment instrument that holds financial value or provides a promise to pay at a later time. Payment card 212 may also include an electronic device configured to initiate contactless payment transactions, e.g., a key fob, a mobile device (such as a mobile device having an NFC tag).

In one implementation, the payment card 212 and/or the devices 202 and 204 may support the same technology for short-range (typically less than 100 meters) and/or low power wireless communication, such as Bluetooth Low Energy (BLE), standard Bluetooth, WiFi, Near Field Communication (NFC) or Radio-Frequency Identification (RFID).

To enable a payment card transaction, the merchant 202 or the customer 206 swipes the customer's payment card 212 through a card reader 210 to extract relevant payment transaction data, i.e., information required for processing payment transactions, including, but not limited to, debit account information, credit cardholders name, credit card number, expiration date and card verification value (CVV), digital permanent account number (PAN), etc. The term "swipe" here refers to any manner of triggering a card reader 210 to read data from a payment card 212, such as by dipping into, tapping, bringing in close contact or passing a card 212 into or through a card reader 210, such as a magnetic stripe card reader, optical scanner, smartcard (card with an embedded IC chip) reader (e.g., an EMV-compliant card reader or NFC enabled reader), radio frequency identification (RFID) reader, Bluetooth-enabled reader, or the like. Even though the description herein relates to a card reader 210 configured to accept and read payment cards with financial information stored thereon, it will be understood that financial information may be stored within any other kind of payment device, which can include, for example, a key fob, a mobile device (such as a mobile device having an NFC tag), or a digital wallet. In addition to card swipe, some payment card transactions may require the merchant 202 or the customer 206 to manually enter all or a portion of the payment transaction data, for example a debit card account number. To this end, the computing devices, for example merchant computing device 204, may include one or more mobile payment applications or application program interfaces (APIs) 214 having a graphical user interface component to allow a merchant 202 or customer 206 to enter payment transaction data. Additionally or alternatively, a separate keypad 216 may be provided for the user to enter the personal identification number (PIN) associated with the debit card. This is discussed in detail with reference to FIG. 2B.

In addition to the payment transaction data pertaining to the customer 206, the merchant computing device 204 may also obtain or extract payment transaction data pertaining to the merchants 202 or the merchant's financial accounts to which the funds have to be transferred; such information may include a merchant identification number, merchant financial account information, identification number associated with the requesting computing device 202, etc.

Optionally, in one implementation, the payment transaction data (read, entered, and/or received in any other way from the merchants 202 and/or the customers 206) may be secured using payment token(s). A payment token replaces the real payment transaction data with static or dynamically changing numbers that map to the real payment transaction data. The payment token may be combined with a dynamic cryptogram that prevents the token from being reused. In another implementation, the payment transaction data may be tokenized such that before dispatching to an external entity the payment transaction data is replaced with a random set of characters structured in a format similar to the original payment transaction data, but having no relationship to the original payment information. Alternatively or additionally, the payment transaction data can be encrypted using Triple Data Encryption Algorithm (commonly known as Triple DES), Advanced Encryption Standard (AES), or other encryption techniques. In one example, payment transaction data corresponding to a transaction may be packaged into a fund transfer request. In another example, the merchant 202 stores and packages a plurality of transactions into a single fund transfer request.

The merchant computing device 204 may send the fund transfer request having the secured or unsecured payment transaction data (e.g., the cardholders name, credit card number, expiration date and card verification value (CVV)) obtained from the merchant 202 and/or the payment card 212 to a computer system 218 of a payment processing service (hereinafter "payment processing system" or "PPS 218") via a communications network 220. The payment processing system 218 can be a cloud computing environment, a virtualized computing environment, a computer cluster, or any combination thereof. The PPS 218 can analyze the fund transfer request based on a plurality of rules stored in a knowledge database 220 before sending the fund transfer request to a computer system 224 of the PPS' acquirer or merchant's acquirer (hereinafter "acquirer 224"). For example, one of the rules in the knowledge base 220 may be determining whether the request is in a certain format or whether the request when run against a risk machine yields a safe score. In one implementation, the acquirer 224 is a bank or financial institution that processes payments (e.g., credit or debit card payments) and may assume risk on behalf of a merchant 202 or a plurality of merchants 202 aggregated by and represented under PPS 218. The acquirer 224 sends the fund transfer request to the computer system 226 of a card payment network (e.g., Visa, MasterCard, Discover or American Express) (hereinafter "card payment network 226") to determine whether the transaction is authorized or deficient in any other way. In some implementations, PPS 218 may serve as an acquirer and connect directly with the card payment network 226. The card payment network 226 forwards the data to the computer system 228 of the issuing bank (hereinafter to "issuer 228"). The issuer 228 is a bank or financial institution that offered a financial account (e.g., credit or debit card account) to the customer 206. The issuer 228 makes a determination as to whether the customer's payment card 212 is valid and whether the payment card 212 has the capacity to absorb the relevant charge associated with the payment transaction. Each of the aforementioned computer systems can include one or more distinct physical computers and/or other processing devices which, in the case of multiple devices, can be connected to each other through one or more wired and/or wireless networks. All of the aforementioned devices are coupled to each other through the communications network 220, including the Internet, intranet, a cellular network, a local area network, a wide area network, or any other such network, or combination thereof. Protocols and components for communicating over such a network are well known and is not discussed herein. Furthermore, PPS 218, the merchant computing device 204, and the customer computing device 208 can also communicate over the communications network 220 using wired or wireless connections, and combinations thereof. If the payment transaction is approved by the issuer 228 and/or the card payment network 226, a payment authorization message is communicated from the issuer 228 to the merchant computing device 204 via a path opposite of that described above.

Responsive to the approval, PPS 218 may be programmed to collect, collate, and store the payment transaction data. Besides the computing devices 204 and 208, PPS 218 can collect the payment transaction data from various other entities, such as the acquirer 224, the card payment network 226, and the issuer 228. Therefore, the payment transaction data can include, e.g., an amount of the payment transaction, the method of payment, an identification of the associated financial account, an identity of the merchant, and item-level information. The item-level information relates to the goods or services involved in the payment transaction. The item-level information can include names, identification numbers, prices, tax, discounts and other price adjustments, and/or descriptions of the goods or services. For example, item-level information of a purchase in a coffeehouse can include information such as tea latte and blueberry muffin (i.e., names), SKU102 and SKU 231 (i.e., stock-keeping unit numbers), $2.99 and $3.49 (i.e., prices).

Using an interactive payment service, the PPS 218 can display the collated payment transaction data to the customer 206 in a variety of ways. For example, the PPS 218 can generate an interactive digital receipt based on the payment transaction data and send the interactive digital receipt to the computing device 204 or 208 in the form of a cell phone message, an electronic mail message, a webpage, a push notification, or a user interface within the mobile payment application 214 as proof of purchase for the customer 206. In one implementation, the customer 206 can interact with the interactive digital receipt for performing various tasks, such as confirming the total amount, adjusting tip amount, entering feedback, applying promotional discount, etc.

In an embodiment of a card-not-present transaction, customer 206 may place an online order by transmitting the data of the payment card 212, such as credit card or payment proxy, from the customer computing device 208 to merchant computing device 204 via any one of a number of communication media (e.g., phone call, fax, mail, email, web, or in general, any method where the payment card is not physically presented and the customer's identity cannot be verified with the signature on the payment card). In one example, the merchant computing device 204 can include, e.g., a web server for receiving the online order information. The computing device 202 can then send the payment transaction data to the acquirer 212 associated with the merchant 202 or the PPS 218 that aggregates a plurality of merchants 202. The acquirer 224, the issuer 228, and the card payment network 226 complete the transaction in a way similar to the card-present-transaction.

Figure 2B:
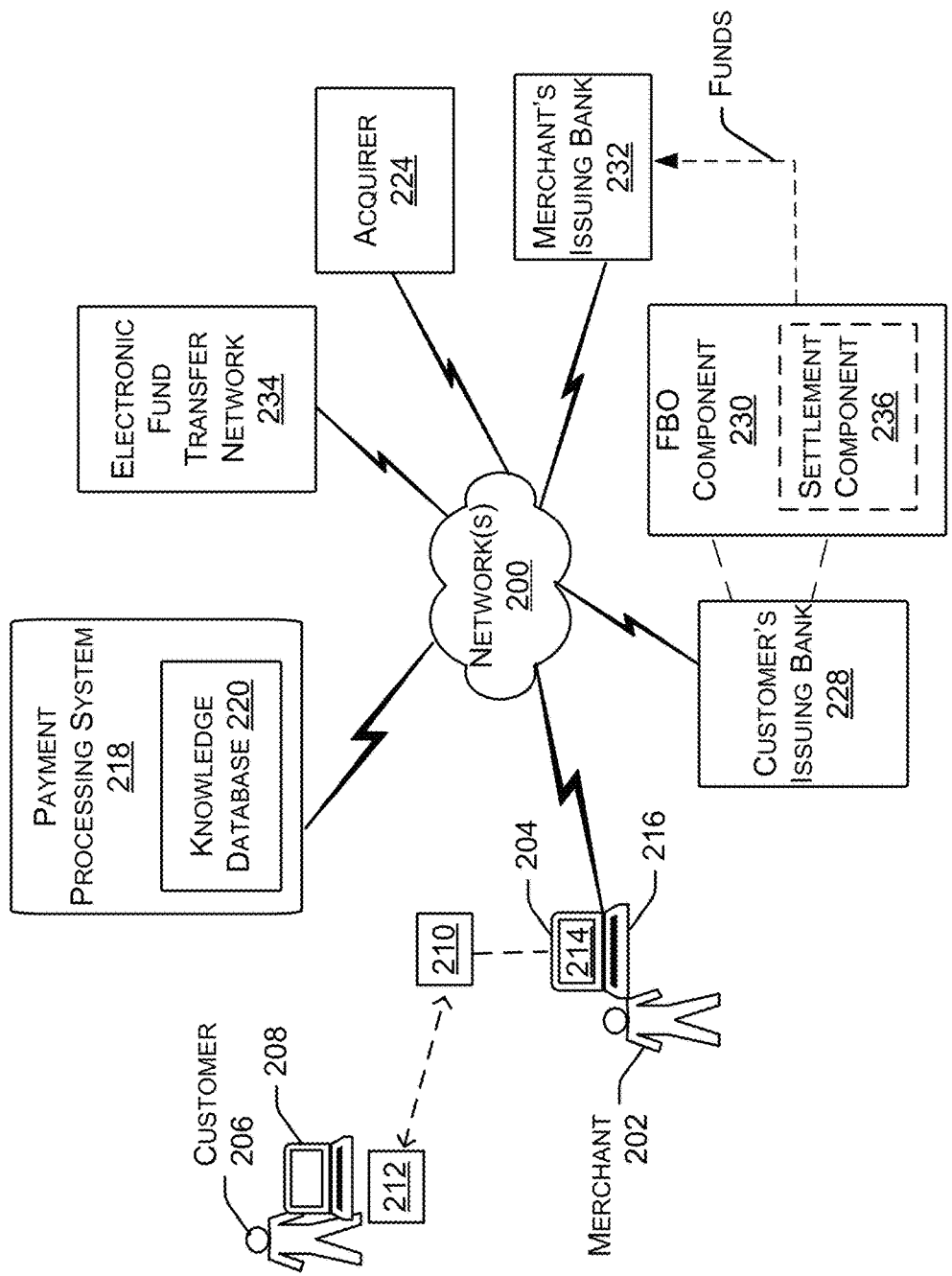
FIG. 2B is a data flow diagram illustrating movement of data and funds between one or more entities in the context of the payment transaction, according to another embodiment of the present subject matter.

In some embodiments, fewer systems than those shown in FIG. 2A may be implemented. For example the acquirer 224, the card payment network 226, and the issuer 228, can be a single entity. Therefore, once the payment card 212 swipes through a card reader 210 of the merchant computing device 204, the device 204 sends the payment transaction data along with the data of the payment card 212 to the single entity via the PPS 218. The single entity analyzes the data and authorizes the payment transaction; the authorization is then reported back to the payment processing system 108 and/or the device 204. Such an implementation may be based on the type of card payment network, e.g., American Express. In some embodiments, the payment card may be a debit card and the transaction may involve entry of a PIN or a digital PAN. FIG. 2B provides an exemplary architecture for such transactions.

FIG. 2B is a payment network illustrating movement of data and funds between one or more entities, according to another embodiment of the present subject matter. In cases where the payment card is a debit card, the flow described in FIG. 2A may apply, for example when the debit card is implemented like a credit card, i.e., without requiring a PIN-based password to authorize transactions. But in some cases, the payment card transaction may need entry of a PIN number to authorize a request for transfer of funds between a customer 206 and a merchant 202. Such an environment is now explained with the help of an exemplary scenario.

In the example scenario, the customer 206 swipes the debit card 212 on a merchant's computing device 202 and identifies the transaction as a debit transaction, for example through selection of "debit" on the PIN pad 216 of the merchant computing device 204. Following input of a PIN number associated with the debit card, the payment transaction data obtained during the swipe action along with the PIN is saved. Additionally, the payment transaction data (e.g., the amount of funds to be transferred, recipient account information, etc.) may be entered through an application program interface (API) installed on device 204 or 208. In order to protect the PIN number and the payment transaction data from accidental or malicious disclosure, hardware-based encryption can be applied within the merchant computing devices 202 that accept such PIN-based debit cards. The received cardholder's PIN number may be encrypted and securely stored within an Encrypted PIN Block (EPB) along with the payment transaction data. In one example, payment transaction data corresponding to a transaction and encrypted PIN may be packaged into a fund transfer request. In another example, the merchant 202 stores and packages data corresponding to a plurality of transactions into a single fund transfer request or batch. The fund transfer request may be sent to a payment processing system, such as payment processing system 218, for storage and processing. In one implementation, the payment processing system 218 may send the fund transfer request to customer's card issuer 228 for authorization. The customer's issuer 228 may approve or decline the transaction, and route the response back to the merchant 202 or the PPS 218 through the same channel. On receiving a "decline message" from the customer's issuer 228, the PPS 218 may generate a message for display on the merchant computing device 204 to let the customer know the fund transfer request has been declined.

In contrast, on receiving an "authorization-and-capture" message from the issuer 228, the PPS 218 may initiate the fund transfer between a customer financial account and the merchant financial account via a for-the-benefit-of (F/B/O) account. The FBO account may be created and managed at the customer's issuer 228, merchant's issuer 232, or another financial institution different from the customer's or merchant's issuer using the FBO component 230. Furthermore, the FBO account may be connected to an entity different from the merchant 202 and the customer 206, such as the PPS 218. The initiation of fund transfer between the merchant 202 and the customer 206 via the FBO account may occur as soon as the authorization-and-capture message is received. In another implementation, the initiation of fund transfer may occur irrespective of whether an authorization-and-capture message is received. Further, the customer may schedule fund transfers in batch mode and/or offline mode to enable a plurality of fund transfer requests to get authorized via a single authorization-and-capture message.

In one implementation, the fund transfer is effected through an electronic fund transfer (EFT) network 234, for example, Accel-Exchange, Shazam, NYCE, PULSE, Star, Interlink, Maestro, etc. In case of a non-PIN based transaction, the EFT network 234 may be replaced by a card payment network 226 (as shown in FIG. 2A). In one implementation, the funds and the fund transfer request move from the FBO account to a merchant's issuer 232. Once the deposit reaches the merchant issuer 232, the merchant 202 may receive notification of the deposit on the merchant computing device 204. The merchant 202 may also be notified in a variety of other ways, e.g., phone call, text message, push notification, pop-up message. Meanwhile, PPS 218 replenishes the FBO account via FBO component 230 with funds sent by customer's issuer 228. Optionally, in one implementation, a settlement account may be associated with the FBO account that may have predetermined amount of funds stored thereon. The settlement account may be furnished with funds from time to time through a settlement component 236 to reduce risk associated with customer defaulting on fund transfers made by PPS 218.

In some implementations, the transactions may be performed or initiated offline. For example, a customer 206 may perform the transaction without availability of a communications network 200 to process the charge completely or after one of the parties connects to a communication network 200. The payment architecture may, thus, allow the user to initiate the charge and obtain the product/service based on past transactions, an enabled offline flag in the user device, etc. The transaction can get completely processed when either the customer device 208 or the merchant device 204 comes online.

Figure 3:
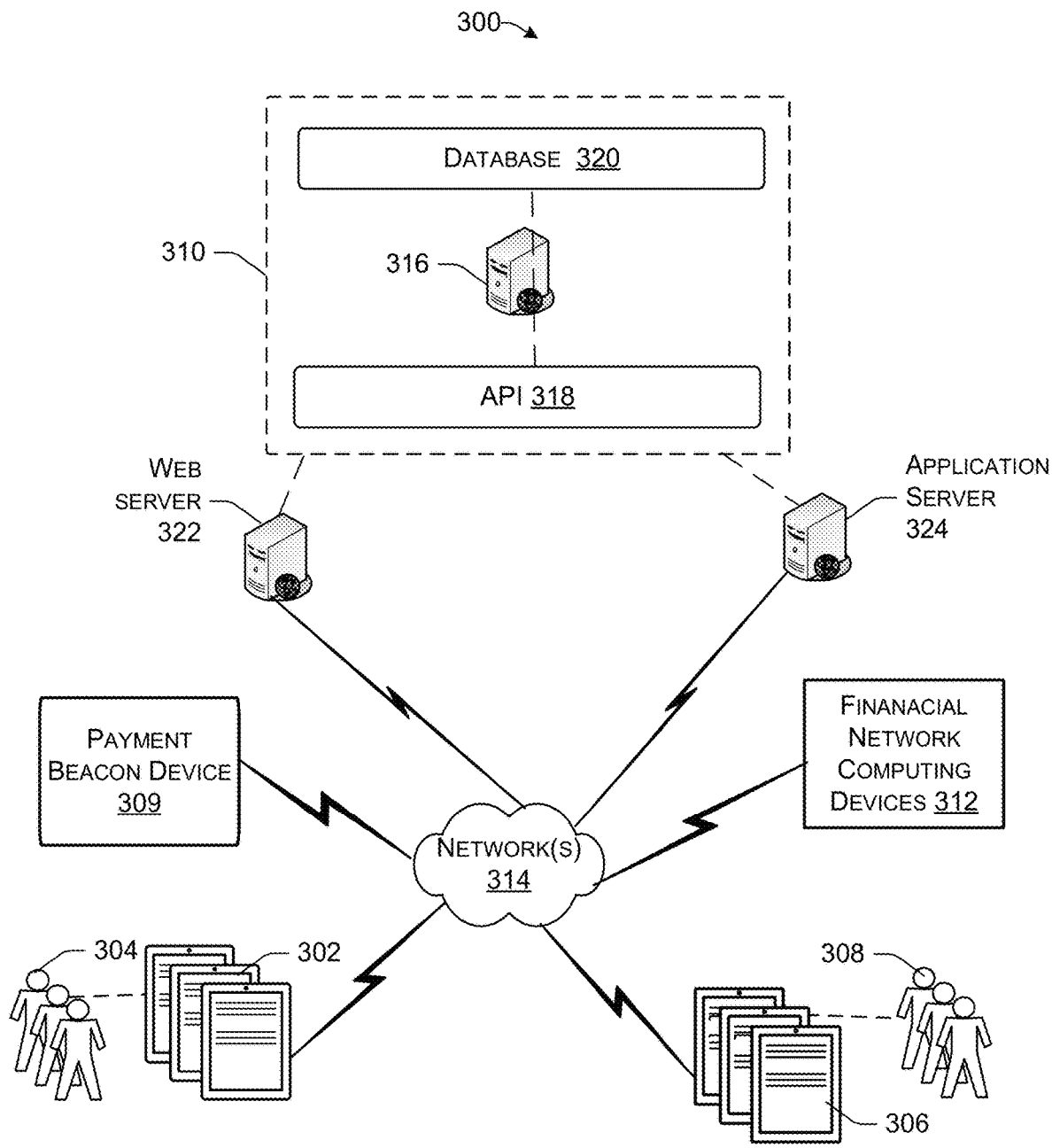
FIG. 3 is a block diagram illustrating a network-based environment in which payment proxies are exchanged between a merchant and a customer, or a sender and a recipient, according to an embodiment of the present subject matter.

FIG. 3 is a block diagram illustrating network-based environment of fund transfer between a sender (e.g., a customer) and a recipient (e.g., a merchant) using exemplary tagging methods and systems described hereinafter, according to an embodiment of the present subject matter. Embodiments are disclosed for facilitating transfer of funds, for example in the form of cash, credits, miles or points, between a sender and a recipient by use of a tagging mechanism ("cash tagging technology"). As used here, the term "tagging" refers to a marking of an alphanumeric character or a string of alphanumeric characters to identify it (i.e., the character or string) for treatment in a specified way. The term "alphanumeric character" refers to a symbol that can be a number (i.e., numeric), a letter (i.e., alphabetic), or a combination thereof.

In one implementation, a set of alphanumeric characters is "tagged" in response to detection of a syntax, for example, a monetary currency indicator prefixing or suffixing the alphanumeric characters. Thus, the monetary currency indicator operates as a tagging mechanism that indicates to a computer system to treat the inputs following the indicator as a request from or intent of the sender to transfer funds, where detection of a syntax (e.g., by parsing), which includes an alphanumeric character tagged by a monetary currency indicator, executes, causes or triggers a transfer of funds. As used here, the term "parsing" refers to a process of analyzing a string of alphanumeric characters and/or symbols, either in a natural language or in a computer language.

In one example, a sender may enter a communication message "I support $redcross with $10" on a messaging platform, a web application, a forum website, or on a landing page, or a web address identified by a uniform resource locator. Communication message can be, for example, forum messages text messages, user-to-user chat messages, or group chat (room) messages that may or may not be in natural language.

The term "messaging application," as used here, refers to any messaging application that enables communication between users (e.g., sender and recipient of a message) over a wired or wireless communications network. The messaging application can be employed by a service provider that delivers a communication service to users, e.g., chat capability. The messaging application can include, for example, an API, or a text messaging application for communication between phones (e.g., conventional mobile telephones or smartphones), or a cross-platform instant messaging application for smartphones and phones that use the Internet for communication. Within a messaging application context, a user can indicate an intent to transfer money by specifying a payment proxy in a TO field of, e.g., a message, that the user inputs within the messaging application. For example, the user enters into the TO field "$redcross." In another example, the user enters into the TO field "$aaron." Once the user enters a payment proxy, or input, into the TO field, the user can enter a message in a body of the message, e.g., "Here is $10," and send the message. In various embodiments, the message can be a text message, a chat message, an email message, or indeed any other type of message that is capable of being exchanged between computing devices. Although this specification may employ text messages as an example, it is to be understood that the payment proxy technology may employ any of these types of messages.

The term "landing page" or "uniform resource locator (URL)" as used here, refers to a virtual location identified by a personalized location address that is dedicated to collect payments on behalf of a recipient associated with the personalized location address. The personalized location address can include the payment proxy discussed above. In some embodiments, the landing page is identified by a uniform resource locator (URL) that includes a payment proxy, where the URL is accessible through a web browser application installed on a customer device of the sender. For example, the URL is www . . . com/$charityName. In another example, the URL is www . . . com/$alex. In some embodiments, the landing page is identified by a graphical user interface (GUI) of a mobile payment application installed on a customer device of the sender. For example, the GUI of the mobile payment application is dedicated to $charityName, where there can be multiple GUIs each dedicated to a different payment proxy.

The term "forum," as used here, refers to a media channel (e.g., a social networking website, a microblog, a blog, etc.) that enables user interaction and engagement through comments, posts, and/or messages. The forum can be employed by a service provider to provide various services to users of the forum, e.g., create messages, post comments, interact with one another, etc. Within a forum context, a user can indicate an intent to transfer money by specifying a payment proxy in a message that the user submits, e.g., "posts," on a particular forum, where that payment proxy carries the syntax of the monetary indicator preceding one or more alphanumeric characters. For example, the user posts a message "I support $funnyguy311 with $10." The monetary indicator can correspond to various currencies, e.g., dollar ($), euro (€), pound (£), yuan (¥), etc. Although use of the dollar monetary indicator ($) is used herein, it is to be understood that any currency symbol could equally be used.

Briefly described, the cash tagging technology enables a sender, who desires to send funds to a recipient using a communication message, to specify the amount by providing, in the message, a first input having one or more alphanumeric characters and a monetary currency indicator prefixing or suffixing the alphanumeric characters. In some embodiments, the sender includes, in the message to the recipient, a second input that contains an alphabetic character and the monetary currency indicator prefixing that alphabetic character. The second input operates as a payment proxy that identifies the recipient. In one example, the payment proxy can be the monetary indicator preceding multiple alphabetic characters, e.g., $aaron. In another example, the payment proxy can be the monetary indicator preceding multiple alphabetic and numeric characters, e.g., $aaron123. The payment proxy is indicative of the financial account of the recipient. Once the financial accounts of the sender and recipient are identified, the fund transfer methods described in FIGS. 2A and 2B can be utilized. The payment proxy can be provided or advertised to the sender 304 in a variety of ways, all of which are described in subsequent paragraphs.

To implement the cash tagging technology, an exemplary system is described herein. According to one implementation, the environment 300 includes a sender device 302 belonging to a sender 304, a recipient device 306 belonging to a recipient 308, a payment beacon 309, a payment processing system 310 ("PPS 310"), and a financial system 312, all of which are connected via a communications network 314. The devices 302 and 306 may be similar in construction and operation to devices 204 and 208.

The PPS 310, in one implementation, can be one or more server computers or work stations 316 and an Application Programming Interface API 318 ("API 318") that are employed by a payment service for facilitating movement or transfer of monetary funds between individual users by use of a tagging mechanism. The PPS 310 may also be equipped with or coupled to a database 320 (e.g., databases 150 discussed with reference to FIG. 1), which can include one or more hard drives, a centralized or distributed data cluster, a cloud-storage service provider, or other suitable storage systems suitable for storing digital data, the sender or recipient account profiles, payment card information, transaction history, and/or for storing computer program instructions that facilitate the cash tagging technology. In some embodiments, PPS 310 can work in coordination with one or more other server computers (e.g., a web server of an online social networking service, a server of an instant messaging service, or any other server of a communication service) to facilitate the cash tagging technology.

The financial system 312 can be one or more server computers or work stations that are employed by one or more financial services for processing a request for transfer of monetary funds. The financial system 312 can include a card payment network where a sender bank account and a recipient bank account are created. The financial system 312 can work in coordination with the PPS 310 to process requests from the PPS 310 to transfer funds between financial accounts of, e.g., the sender 304 and the recipient 308.

The sender device 304 or recipient device 306 can be any processing device capable of receiving user input as well as transmitting and/or receiving data via the network 314. In some embodiments, the sender device 304 can be a conventional computer system (e.g., a desktop or a laptop computer) or a mobile device having computer functionality (e.g., a tablet device, a smartphone, or a conventional mobile phone (not shown)). The sender device 304 can be configured to communicate via the network 314 with the Web server 322 and/or the application server 324. In some embodiments, the sender device 304 can retrieve or send information to the Web server 322 and/or the application server 324, and run one or more applications with customized content retrieved from the Web server 322 or the application server 324. For example, the sender device 304 can execute a browser application to enable interaction between the sender device 304 and the Web server 322 (e.g., to access a social networking website), or can execute a customized client to enable interaction between the sender device 304 and the application server 324 (e.g., to access a messaging application).

In one implementation, the recipient 308 can transmit, "broadcast" or otherwise display, via a recipient device 306, the payment proxy information "payment proxy" of the recipient 308 or recipient's financial account, which can be seen by the sender 304 via a sender device 302. The recipient device 306 can display the recipient's payment proxy using, for example, internally located static or dynamic payment beacon, for example, BLE beacon(s), QR code(s), e-Ink electronic paper display, RFID(s), NFC tags, LCD display(s), etc. The sender 304, who wishes to send money to the recipient 308, e.g., as support for the recipient 308, can establish a communication channel or connection (or pair) to the recipient device 306, and then capture and use the displayed payment proxy to send money. In another implementation, the recipient 308 may install one or more payment beacon devices 309 for transmitting payment related information, such as payment proxy. Thus, instead of pairing to the recipient device 308, the sender device 302 can be paired to the payment beacon 309 closest to the sender device 302. The payment beacon device 309 may be a low-complexity, low-power device that transmits payment proxies within a certain geographical area. Furthermore, a plurality of payment beacon devices 309 may be used to create a mesh network of related beacons and thus, provide a wider area of geographical coverage as compared to a single beacon.

In one example, the recipient device 306 or the payment beacon 309, as the case may be, transmits payment proxy of the merchant/recipient, in the form, for example "$gymXYZ" around the entrance of a gym. For example, this may be for a day pass at a specific gym.

The sender or a customer 304 receives the payment proxy being transmitted by a payment beacon 309 or a recipient device 306, and opens a web-application, messaging application, a forum or a landing page to initiate payment for a product or a service. The exemplary methods and systems detect the sender's intent to send money, e.g., $10, to "$gymXYZ" tagged with monetary indicator "$" and initiate the transfer of money upon identification of a recipient's financial account associated with a payment proxy "$gym XYZ." In another example, a sender, Alex connected to "$alex" may create a text message "Here's the $10 for the day pass." through a mobile application and send to a recipient gymXYZ connected to "$gymXYZ." The sender 304 may not have any personal relationship with the recipient 308, and as such, may not know a phone number, an email address, or any other personal contact information of the recipient 308. However, the sender 304 can send money to the recipient 308 by specifying, in the message, the payment proxy associated with the recipient 308.

In one implementation, the Web server 322 monitors user messages on the system website for any particular message that includes a user input having the syntax of the monetary indicator preceding the alphanumeric characters, and forwards a request to the API 318 that includes, e.g., the message and an identifier associated with a creator of the message (i.e., the user), for the API 318 and/or the server 316 to process the money transfer. In such an example, the server 316 receives the message via the API 318 and can parse the message for a payment proxy (i.e., the user input having the syntax) to identify a recipient associated with the payment proxy. Upon identifying the recipient and an associated recipient financial account, the server 316 initiates a money transfer to that recipient. In some embodiments, the API 318 (e.g., instructed by the server 316) can also send back, in a response to the Web server 322, appropriate data for display to the user. For example, the data is an HTML string that displays a confirmation message with a link for prompting the user to confirm his/her intent to transfer money to the recipient associated with the payment proxy. In some embodiments, the server 316 sends a confirmation message to user using information included in the request received from the web server 322, e.g., an identifier associated with the user. For example, the identifier can be an email address of the user, and the server 316 (e.g., via an email server) sends an email message to the user's email address.

In some embodiments, the user interactions on the system website lead to internal API communication, which involves the Web server 322 monitoring the user interactions for an indication of an intent to transfer money, sending, in response to such indication, requests (e.g., POST or GET requests) to the API 318 of the server(s) 316 to query the database(s) 320, and displaying the data returned by the API 318 of the server(s) 316 as appropriate. The indication of the intent is determined based on an identification of a user input, e.g., a string of characters, that has a particular syntax, the syntax being a monetary indicator preceding one or more alphanumeric characters. The user input having the syntax operates as a trigger to send money to a payment proxy represented by the user input.

To complete payment transactions, the payment processing system 310 can communicate with one or more financial networks 312. In some embodiments, the payment processing system 310 can communicate with the computer system of a debit card payment network, e.g., STAR or PULSE. In some embodiments, the payment processing system 310 can communicate with the computer system of a credit card payment network, e.g., Visa® or MasterCard®. The computer system of the card payment network can communicate, in turn, with the computer system of a sender card issuer, e.g., a bank, and a computer system of a recipient card issuer, e.g., a same or different bank. The sender card issuer and the recipient card issuer can transfer money, e.g., over a debit payment network, in response to a request to transfer money from the payment processing system 310.

In some embodiments, the payment processing system 310 can communicate with a computer system of an Automated Clearing House (ACH) network. The computer system of the ACH network can communicate with a sender bank account and a recipient bank account. The sender bank account and the recipient bank account can transfer money, e.g., using the ACH network, in response to a request to transfer money from the payment processing system 310. In other embodiments, there can also be computer systems of other entities, e.g. the card acquirer, between the payment processing system 310 and the card issuers, and between the payment processing system 310 and the bank accounts. Additional payment flows are described in FIGS. 2A and 2B.

Figure 4A:
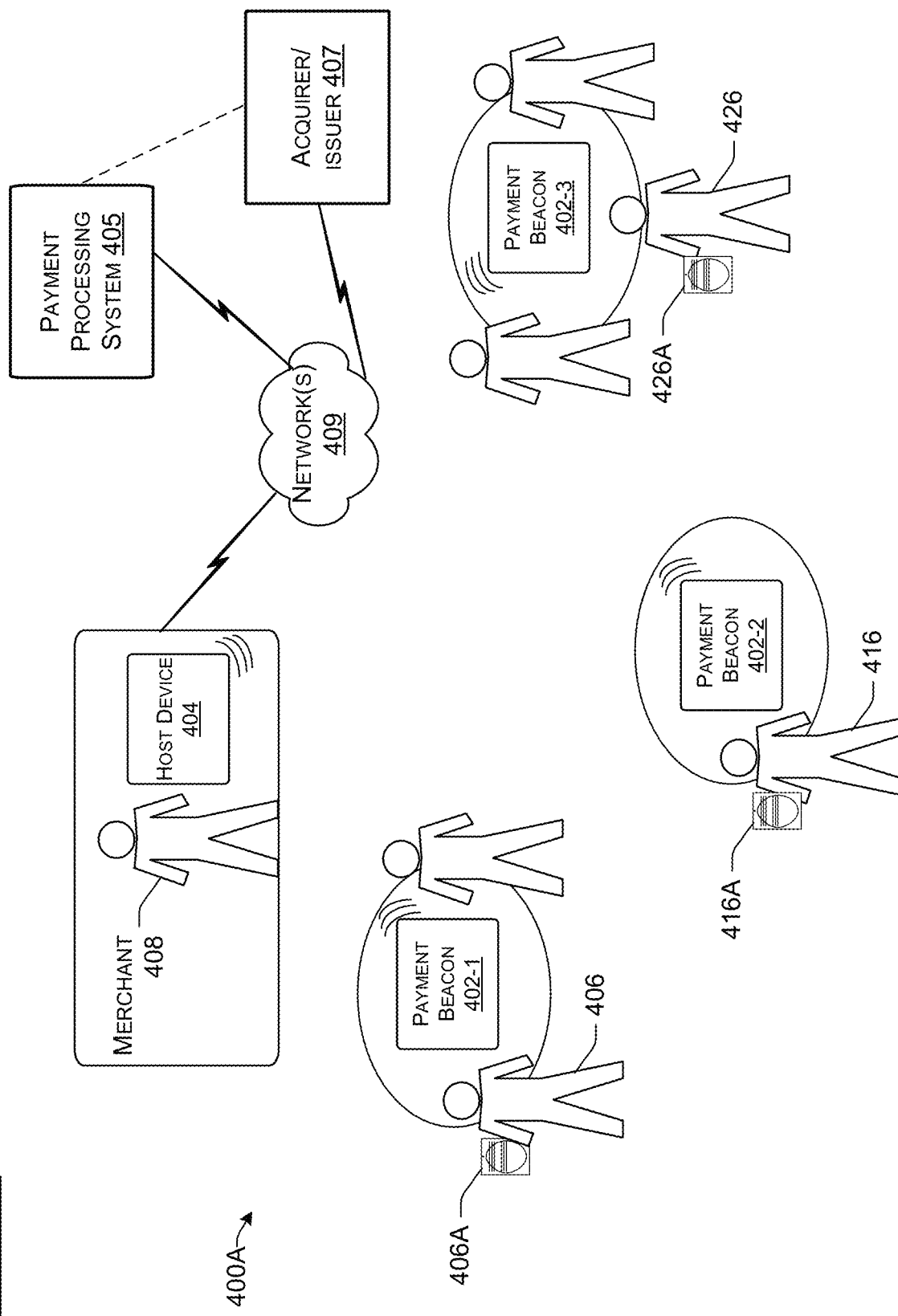
FIG. 4A is block diagram of an exemplary scenario for transmitting payment proxy to neighboring devices, according to an embodiment of the present subject matter.

FIG. 4A is block diagram 400A of an exemplary scenario for transmitting payment proxy to neighboring devices, according to an implementation of present subject matter. In an exemplary scenario, a payment object reader 402 (such as 402-1, 402-2, and 402-3) is communicatively coupled to a host device 404, e.g., through a local area network, e.g., Wi-Fi, Bluetooth, or BLE, etc. The payment object reader 402 is capable of receiving payment information from a customer 406 through one or more payment objects, such as a magnetic-stripe payment card, an NFC card, and an EMV card, or a virtual hardware or software wallet. In one implementation, the payment object reader 402 may be similar to the PPS controller 100 described in FIG. 1. In another implementation, the payment object reader 402 may be a payment beacon 309 described in FIG. 3. Thus, the payment object reader 402 can server as a beacon and transmit payment related information to the customers 406 and/or merchants 408 based on one or more communication protocols, such as BLE, RFID, etc. The payment object reader 402, interchangeably referred to as payment beacon 402, can be paired with a customer device 406A, e.g., in accordance with the Bluetooth communication protocol. In other implementations, the payment object reader 402 is automatically connected to the customer device 406A based on predefined rules, such as location or identity of the customer device itself. In some implementations, where a plurality of payment object readers 404 are present, the customer device 406A may be presented with a list of available beacons in a predefined area, the beacons being arranged in order of distance from the customer 406, or signal strength, or in order of the alphabetical names. A user device can also check in by communicating directly with the host device 404 or payment beacon 402, e.g. by providing a BLE token to, e.g., the payment beacon 402. "Checking in" may thus refer to the customer's action through a user application to indicate availability to conduct a payment transaction, request for payment proxy of the merchant 408, or communication by the user device of such an indication to the payment processing system or to the host device 404, as the context requires.

Checking in with a merchant 408 allows a merchant application installed on the payment beacon 402 to display an option to charge the user's financial account using a cardless payment transaction via the payment proxy of the merchant 408 or the user 406. In essence, checking in constitutes a consent by the user to conduct a cardless transaction with the merchant. This consent differs from actual authorization of the transaction, which the user would provide, e.g., verbally, upon learning the amount of the transaction.

Checking in can also constitute a consent by the user to have radio signal strength of a user device in possession of the user to be measured by the host device 404 and by other user devices that are nearby or that have also checked in with the payment beacon 402. Checking in can also constitute a consent by the user that the payment beacon 402 can cause the user's device to measure and report the radio signal strength of the payment beacon 402 and other user devices that are nearby or that have also checked in with the merchant 408. For example, the customer device 406A can measure the radio signal strength being emitted by the payment beacon 402-1, and the customer device associated with customer 416 can measure the radio signal strength emitted from payment beacon 402-3. Similarly, each other customer device can measure the radio signal strength emitted from each other payment beacon, or vice versa.

The payment beacon 402 can also query other stationary merchant devices, e.g., host device 404, for measurements of the radio signal strength emitted by the customer device 406A, 416A, and so on. The host device 404 can also query the customer devices for measurements of the radio signal strength emitted by other customer devices, other merchant devices, and other fixed location beacons. For example, the fixed location beacon can be a fixed BLE device that emits a signal having a unique identifier. The host device 404 can then determine a distance of each customer device from the host device 404 and the beacon using the obtained measurements of radio signal strength. The host device 404 can use the distances to rank the user devices by distance and pair a beacon 402 to a neighboring customer device. Once paired, the beacon can transmit payment proxy for the customer to initiate payments using an application stored or accessed via the customer device. The customer device sends the payment request to the host device 404 or directly to the payment processing system 405.

The host device 404 is capable of processing the transaction via the payment processing system 405 based on the information received from the payment object reader 402 by causing funds to be transferred from a financial account of the customer 406 to a financial account of a merchant 408 associated with the host device 404. The host device 404, for example a register operated by a merchant 408, may be connected to a payment processing system 405 and acquirer/issuer 407 through the data communication network 409 (e.g., similar to communication network 104) to allow transfer of payment information from one entity to another. The host device 404 may not necessarily process the transaction as soon as the transaction is performed or when the information is received from the payment object reader 402. Additionally, a plurality of transactions may be processed in batch at a later time.

In some implementations, the payment object reader 402 may include a hybrid interface having a "swipe" slot for receiving magnetic stripe-type cards, "dip" slot for EMV or chip-type cards, and components for interfacing with payment objects operating on Bluetooth, Bluetooth LTE, Wi-Fi, Li-Fi, NFC, mesh network, GPS, and other wireless technologies. In some embodiments, a single component can support capabilities of reading data from a variety of payment objects.

In other implementations, the payment object reader 400 may serve as a wireless beacon. Wireless beacon refers to a personal user device that continuously or repeatedly emits mid-range to short-range radio signals that can communicate information wirelessly to other devices. The radio signals emitted by the wireless beacon can be part of any appropriate standard for mid-range to short-range radio communications having an operable range of at least one meter and up to about 50 meters, e.g., Bluetooth, Bluetooth 4.0, and Bluetooth Low Energy (BLE). The radio signals described herein can be any appropriate type of signal, e.g., a broadcast signal that indicates presence of the device to nearby devices, a pairing signal that requests automatic pairing with a nearby device, or a connection signal that transmits data to a connected nearby device, to name a few examples. The wireless beacon can be part of a wristwatch, a mobile phone, a portable music player, a tablet computer, a laptop computer, a personal digital assistant, a smartphone, a keychain beacon, or another handheld or wearable mobile device.

In one implementation, the payment object reader 402 can communicate information, e.g., payment related data, such as payment proxy of the merchant's host device or the payment object reader or both, to another device using an automatic pairing process, e.g., without the devices engaging in a pairing process that requires user input and without requiring explicit user authorization to communicate with another device. The payment object reader 402 may release such payment related data into a predefined network, geographical area or to a selected network of users either persistently or on activation by a user initiated trigger to sensors. This payment proxy may be used by the user to make a payment to a merchant who is associated with the payment object reader 402, as described in FIGS. 1-3. The payment object reader 402 may be powered in multiple ways, for example using solar batteries, allowing for the payment object reader 402 to be placed at locations requiring minimal supervision and/or for an extended period of time. There may be locations e.g., national parks, ski resorts, gas stations along freeways, etc., where it may not be feasible to install a traditional point-of-sale system due to geographical, terrain, size or economic constraints. There may also be temporary events, such as concerts or plays, where a traditional point-of-sale system may not be a practical solution. The payment object reader 402 may be installed at least at such exemplary locations while keeping the establishment costs and efforts at bay. For example, the payment object reader 402 can be attached to trees at a national park. The payment object reader 402 may optionally include an optical output device to indicate the signal strength of connection between the customer device 406 associated with a customer and the payment object reader 402.

Consider a restaurant set-up where patrons are served on different tables. Each table may be provided with a payment object reader 402. The payment object reader 402 may transmit a unique payment proxy specific to the table. For example, the payment object reader 402 may be transmitting "$Pizzashop_Table1" or a payment proxy customized by the merchant/recipient 308 according to the name on the reservation "$Pizzashop_alex." At the end of meal, the customer 406 may communicatively couple to the payment object reader 402 to obtain the payment proxy to initiate payment. Optionally, the payment proxy may automatically populate in an application on a customer device or the payment object reader 402 in response to a user indication to make payment. In another implementation, a frequently visiting patron may not need to pair the device every time he or she visits and the same payment proxy may be used for payment after meal. Once the payment proxy is obtained, the customer may use methods and systems described above to cause fund transfer. A confirmation may be sent to the customer via the host device after the transaction is processed and the payment object reader 402 may be reset before seating the next patron.

In another example scenario, consider a state park. To enter the state park and buy a state park entrance, the user may open a payment application, including but not limited to: a messaging application installed on the user device, a web application, a personalized URL, etc. The payment application may allow the user to enter in the "TO" field a payment proxy, email address, phone number, or any other kind of identifier identifying the merchant or the entity to which payment is being made. A payment object reader 402 installed at the entrance of the state park may be broadcasting the relevant payment information. So, the payment object reader 402 may be transmitting payment proxy "$californiastatepark" in an area defined by the BLE standards. The user device 408 through its Bluetooth transceiver sees the broadcasted payment information. Such information can be captured and presented to the user on a messaging application, say in the form of list along with the most recent payment proxies with whom the user has interacted in the past.

In another embodiment, a quick response (QR) code can also be displayed via an output display device associated with or included within the payment object reader 402. The user captures an image of the QR code, such as by taking a picture of the code or scanning the code using a camera on a mobile phone or any device that can capture an image. The QR code may include embedded thereon payment proxy or other payment information to enable the user to purchase and pay for a desired product or service, such as park entrance. The QR code can then be decoded or processed, such as by software in the phone. A QR code reader/decoder software may be installed on the user device. The type of display can vary depending on the content of the QR code. For example, the user may be directed to a web page of the merchant selling the product or the establishment managing the facility or providing services, where the user can obtain more details about the product and/or service. The display may also show a more detailed description of the service and additional options for a user to purchase. For example, in an amusement park, the user may using the QR code access the park's website to view various packages, select a package and pay for the desired package using the payment proxy embedded in the QR code.

In other implementations, the user may enter the payment proxy into a messaging application described above. The user may obtain such information from a static or digital display, for example an electrophoretic ink display. The user may also obtain the payment proxy by tapping on the surface of an NFC-enabled payment object reader.

In another scenario, the merchant may push its payment proxy onto a specific device, say based on its distance to a customer device. For example, if the a mobile device is close to merchant's register, the merchant may push the payment proxy, amount owed, and transaction receipt onto the closest mobile device.

In yet another scenario, a merchant may provide a requested product faster than a transaction takes to complete or about the same time it takes to complete a transaction. This may be particularly helpful with EMV transactions that may be associated with slower transaction times. In one implementation, the customer may request a desired product or service by providing a payment proxy associated to their financial account. This solution removes friction from the transaction experience. The customer can leave the point of sale and can complete the transaction at their own pace. Likewise, a merchant can enter the product requested into a register application and select a payment proxy without having to wait for the transaction to get processed completely. For example, consider a coffee store environment managed by Joe and Bob. Joe and Bob can both provide two individual iced coffees in the amount of time it takes for one payment transaction, such as EMV transaction, to occur. Amy, who is under-caffeinated, approaches a Joe and Bob's point-of-sale system manned by Joe and requests an iced coffee. Through Bluetooth mesh-networking technology, Amy's payment proxy appears on Joe and Bob's application in a list of nearby people having payment proxies. Joe adds an iced coffee to the current order and asks Amy for her payment proxy. Joe can also select the payment proxy from available addresses and Amy is free to go.

Joe's selection of Amy's payment proxy immediately sends a request for funds to Amy's messaging application, email client or directly to the financial institution where Amy has an account. Amy steps away and, by fulfilling the request in her mobile device (either by responding to a push notification or entering a PIN code or clicking on a confirmation link), she completes the transaction while Joe begins to take the next order. Once Amy has completed the transaction a notification is made to Joe and Bob's registers. Bob, sees this notification with the order details and grabs Amy's iced coffee. Bob calls Amy's name and hands her the coffee as the next customer's transaction completes just in time for Bob to grab another coffee. In this manner, by splitting the transaction between two people while adding transactions to a pipeline, the overall transaction time is considerably reduced. This can also be applied in Concerts/Festivals where merchandise like shirts, water bottles, etc., are very quick to hand out but are slowed down because in-person transactions take long.

While the description above relates to specific technologies for transfer of payment information, such as payment proxy, it will be understood that the description can be extended to cover other technologies, such as NFC tags, RFID tags, etc.

Figure 4B:
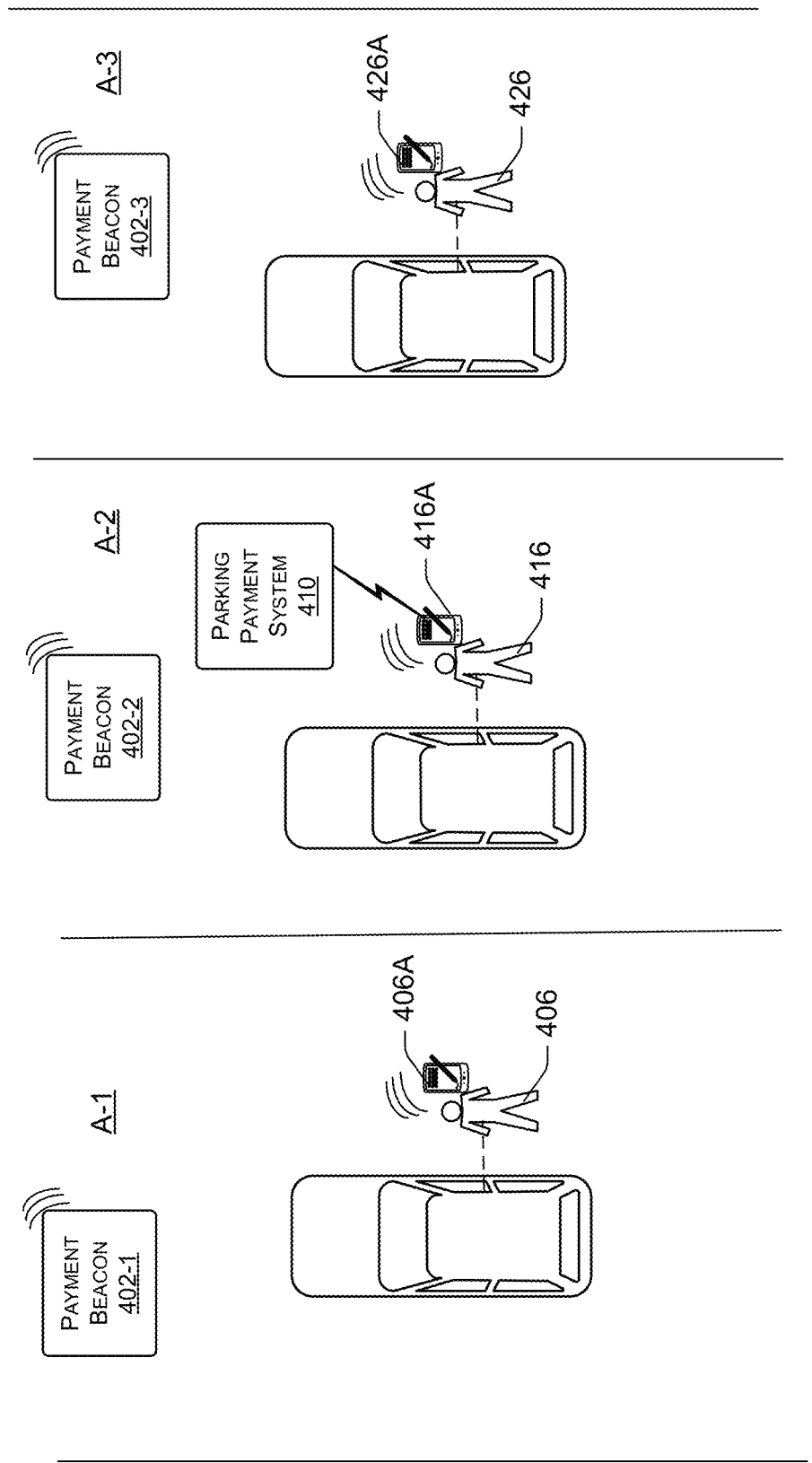
FIG. 4B is a block diagram of an exemplary scenario for transmitting payment proxy to neighboring devices, according to another embodiment of the present subject matter.

FIG. 4B illustrates an exemplary scenario for implementing an embodiment for transmitting payment proxy. In one implementation, a plurality of payment object readers (interchangeably referred to as payment beacons) 402-2, 402-2, 402-3, such as the PPS controller described in FIG. 1 may be installed in a vehicle parking garage. The parking location can be identified to the user by a location number posted on a parking meter pole or other fixed object at the parking location. Each parking location, such as a single-space stall or a meter number or a parking lot, is associated with a unique location number in a database of the parking payment system such that the system can determine a geographic location for assignment to the user by matching the location number given by the user with a predetermined geographic location stored in the database for that location number. Furthermore, each parking location can be served by one or several readers. Each reader can dispatch payment information specific to the parking location. Thus, when the user pays for the parking session, the parking payment system determines the user's parking location, which is associated with a geographic location or the parking address, and utilizes the geographic location information to process parking related payments. Determining the user's parking location inherently determines the payment reader corresponding to the user.

For example, if a reader 402 is installed at row A, spot 3, may transmit a payment proxy "$parkingA3." The user's vehicle parked at A-3 may receive such information, on a messaging application, as a list of suggestions amongst other payment proxies pertaining to other readers. Alternatively, the payment beacons 402 may show up as a list of available nodes when the Bluetooth option is selected on the customer device. The "To" field may be automatically populated with the payment proxy information based on the user's geographical location. The geographical location may also be used to confirm user's selection of parking location from amongst a list of suggested entries.

For example, users 406, 416 and 426 may be associated with a customer device, such as customer device 406A, 416A, and 426A, respectively. The user 416 parks a vehicle at A-2 location and opens an application (third-party/forum/customized website) for payment. The user 416 may be asked to register or sign-in with a parking payment system (or related application) by using user's personal identifying information, e.g., a contact number (handheld or in-vehicle) or other means of making contact with the user, and optionally, payment proxy information associated with his account. The application also provides service terms that permit collection of location data related to the parking payments. After registration or signing-in, the user 416 can pay for parking using a parking location by initiating communication with the parking payment system and providing information on the parking location and amount of time to be purchased. The amount of time purchased establishes the duration of time for which the vehicle may remain legally parked. The duration is also referred to as the parking session. In some cases, the parking session may be open-ended and closes only after the vehicle has left the location.

In some cases, the payment beacon may serve as a payment meter, or be associated with a parking meter where the parking session starts when a Bluetooth channel is established or when a sensor (not shown) detects when a vehicle is parked in a parking location. The payment beacon in this case includes a radio transceiver (not shown) for communicating with a parking payment system. As noted, that transceiver can comprise a cell telephone transceiver. Operation of the payment beacon includes transmitting radio signals to, and receiving radio signals from, the parking payment system. Alternatively, the communications between the beacon and the parking payment system can take place over Internet or Wi-Fi communications, cell phone data networks, voice communications links, email or text messaging, SMS protocols, and the like, so long as parking location and user identification data can be transmitted by the meter to the parking payment system for payment authorization, alerts and notifications can be delivered to the user.

The customer device 416A receives the payment proxy transmitted by the nearest payment beacon or its transceiver (payment beacon 402-2, in this case). An associated with the parking payment system shows a list of available payment proxies, including the one transmitted by payment beacon 402-2. In one embodiment, the application gets automatically populated with the received payment proxy of the beacon. Optionally, the user 416 may choose the payment beacon from amongst the list of beacons in the area. For example, the user chooses the nearest beacon, the location indicating the beacon most likely to be associated with the user's parking location. The payment to a payment proxy indicates payment for a parking location. The user sends the message generated through the application to the parking payment system.

Once approved or once the transaction goes through, visual or audio indicators, like light-emitting diodes on the payment beacon may be configured to light up in a specific way to indicate confirmation of payment to the parking security and/or user 416. The customer device uses cell phone communications to pay for the parking. Other forms of mobile communication can be accommodated, such as WiFi or Internet-based communications among the user and/or the payment beacon device, payment meter, and the parking payment system, such that a user who wants to utilize a parking location initiates communication with the parking payment system (or an application thereof) and provides identification of a parking location and authorizes payment for using the parking location for a specific duration of time (i.e., for a parking session). The technique may be applied to both single-space and multiple space parking. It should be understood that reference to single-space and multiple space parking is a reference to the fidelity of location identification that automatically occurs with payment. That is, if a parking space is located within a parking lot containing many parking spaces, then it may be that the only geographic location information for persons parking at the lot will be a location associated with the lot as a whole. That is, all vehicles parked in the parking lot may be assigned the same geographic location. Alternatively, each parking space in the lot may be identified with a particular geographic location, which is assigned to the user at the time of making payment for the parking session, in accordance with the discussion herein. Parking locations that are single-space locations will be assumed in this discussion, but it should be understood that the principles described herein can be applied to both single-space and multiple space parking. Examples of single-space parking include on-street, single-stall parking spaces.

In some cases, the parking time may be extended even though the customer device 416A may not be within the short range network of the payment beacon 402-2. The customer device 416A may already have information related to payment proxy associated with the beacon 402-2, which the user 416 uses on an application of the parking payment system to make additional parking payments. Alternatively, parking payment system may maintain a map associating beacons to parking spots. The user may use information known about the parking spot to determine beacon, and consequently the payment proxy, to make payments for parking.

FIG. 5 illustrates an exemplary method for processing one or more payment transactions between a merchant and a customer, according to an embodiment of the present subject matter. The process 500 can be performed by one or more components, devices, or components such as, but not limited to, the customer devices, the Web server, the application server, the payment processing system, merchant device or POS terminal such as PPS controller 100, or payment beacon or other component or device. As illustrated in FIG. 5, the process 500 includes a set of operations from block 502 to block 516.

The process 500 starts with the operation at block 502, where the customer opens an application or an interface to initiate a payment transaction. The interface may be a customized interface designed for a specific purpose. For example, at the state park entrance, the user may be asked to open a specific application or website customized for state parks. Alternatively, the customer may access an application installed on the customer device and controlled by the payment processing system.

At block 504, the customer may request a payment proxy from a payment beacon device in response to a payment transaction or to start a payment transaction for a product or service. For example, the customer may activate or engage with the payment beacon device via a software application and/or by providing an audio/video/tactile input with or without the customer device. The customer may switch a button or tap the surface of the payment beacon device to activate the payment beacon to emit a payment proxy. The payment proxy may have a syntax, the syntax including a monetary currency indicator preceding an alphanumeric character. The customer device may then connect, or pair, via Bluetooth protocol, to the payment beacon device to receive the payment proxy. The manner in which the payment proxy is received or the format of data, such as payment proxy, encryption, etc., may vary based on the communication protocols and merchant-customer preferences. Furthermore, the payment proxy may be customized based on the customer requesting the information. In some implementations, the customer may be given the option of a number of payment proxies, for example corresponding to a number of active payment beacon devices, for example as a list and the customer may choose one amongst others.

The operation at block 506 determines whether a communication component is active on the customer device to receive data from peripheral devices, like the selected payment beacon. For example, the communication component may be a Bluetooth, NFC or Wi-Fi component, configured to receive the payment proxy through communication technologies, such as Bluetooth, RFID, and Wi-Fi respectively. If the determination is "Yes", the flow proceeds to block 508. If the determination is "No", a notification or error message may be sent to the customer to change communication settings on the customer device at block 507. Alternatively, the communication component may be active but the signal strength may not be strong enough or may be spotty. To this end, a notification may be sent to the customer to change the communication network preference. Thus, the customer device may receive a message requesting a switch from Wi-Fi to Bluetooth for the purposes of receiving the payment proxy. Once the customer makes the selections at block 508 and the customer input is received to enable the means of communication to receive the payment proxy, the flow returns to 506 where it is confirmed whether the communication component is active or has been activated successfully.

The operation at block 510 receives the payment proxy from the payment beacon via one or more preferred or selected communication protocols. For example, the customer may select BLE as a preferred power-saving method to receive payment proxy.

On receiving the payment proxy, the operation at block 512 accesses a messaging application, a web application, a forum, a customized web application via a unique URL, etc., to generate a message. The message may optionally include a "To" field and a "Body" field. The customer populates the "To" field with the received payment proxy, and may or may not enter content in the body field. The customer may optionally specify a transaction amount in the body field or any other field provided for that purpose. The transaction amount relates to the cost of the product or service. In some embodiments, a message may be generated with prepopulated fields with "To" and "From" information derived from the sender and recipient's payment proxies.

The operation at block 514 includes establishing one or more communication channels with a payment processing system. The customer submits the message of fund transfer generated at block 512 to the payment processing system, which parses the payment proxy to identify the merchant associated with the payment proxy in the message. The parsing may be based on a stored association between the payment proxy and the merchant, where the stored association may have been established in a registration of the payment proxy with the payment processing system. Such messages may be parsed through the bridge mechanism into appropriate grammar. Entries made into supplied fields may be tagged as having been entered into the particular fields, and parsed as such. The entered terms are then passed along with the field tags, which act to instruct the parser to generate queries directed to appropriate tables and/or fields. In one embodiment, the parser may generate queries in standard query language (SQL) by instantiating a search string with the proper join/select commands based on the tagged text entries, wherein the resulting command is provided over the bridge mechanism to the payment processing system as a query. Upon generating query results from the query, the results are passed over the bridge mechanism, and may be parsed for formatting and generation of new results. Such new results, all determined to be potential identities of merchants, may then be sent to a financial network to process the transaction.

The operation at block 516 identifies a financial account, e.g., a debit card account, that is associated with the customer based on the identity of merchant determined at block 514. The financial account information can be determined based on a stored association between the merchant identity and the financial account, where the stored association is established in a previous transaction (e.g., account registration or a past money transfer). The operation at block 516 may be executed by a payment processing system that determines the account associated with the merchant and initiates a transfer of funds indicative of the money transfer amount from a financial account of the customer to a financial account of the merchant to fulfill a payment transaction. In one implementation, the payment processing system can request customer's account information to furnish the fund transfer request. Accordingly, a confirmation message may be sent to the customer and/or merchant confirming successful payment.

FIG. 6 is a flowchart illustrating an example process 600 of exchanging payment information between a merchant and a customer. The process 600 can be performed by one or more components, devices, or components such as, but not limited to, the customer devices, the Web server, the application server, the payment processing system, merchant device or point-of-sale (POS) terminal such as PPS controller 100, or payment beacon or other components or devices. As illustrated in FIG. 6, the process 600 includes a set of operations from block 602 to block 614.

The process 600 starts with the operation at block 602. A customer purchases or requests a product and/or service from the merchant. At block 604, the merchant via a mobile device or POS terminal generates an intermediary transaction summary detailing the product or service requested by the client. For example, the transaction summary includes description of the product or service requested, the price or cost of the product or service, and in case of multiple items, the total amount the customer owes to the merchant, including other costs such as taxes, customs, etc. The operation at block 606 identifies the customer device associated with the customer through a customer identifier. Examples of customer identifier include name of the customer, name of the customer device, such as a Bluetooth network ID, payment proxy associated with the customer device, a phone number, an email address, distance between the customer device and the POS terminal, and the like. In some embodiments, the operation at block 606 is carried out by a receiver component of the POS terminal by connecting with a transmitter component of the customer device. In some embodiments where only one customer device is available in a network, the customer device may be determined or selected without any customer identifier or customer input. In such cases, the flow may skip processing at block 608.

The operation at block 608 establishes a communication channel between a payment beacon component of the POS terminal and the receiver component of the customer device, based at least on the client identifier. For example, the communication channel may be based on a variety of communication protocols, such as Bluetooth, Bluetooth Low Energy, RFID, Wi-Fi, NFC, etc. These protocols may be set in the order of preference, such that the unavailability of one network may automatically trigger activation of another protocol. Thus, if Wi-Fi is unavailable, the communication channel may be established using Bluetooth or BLE protocols.

At block 610, it is determined whether a successful communication is established. In some cases, success may be determined by sending test data on the communication channel and receiving a "set-up complete" flag at the end of set-up. A confirmation message or notification may be sent by and at either or both devices, namely merchant terminal and customer device, indicating successful communication channel set-up. Alternatively, the customer may confirm that a communication channel was successfully established and the flow transitions to block 612. If set-up fails, the method re-attempts using the operation flow at step 608 or sends and error to the merchant via the merchant device or point of sale terminal.

At block 612, the payment proxy associated with the merchant device, which the client can use for payment of transactions, is transmitted via the established communication channel and preferred or selected communication protocol. The operation at block 612 relates to exchanging data via the established communication link or channel. For example, the POS terminal may transmit information to assist the customer to make payments. Thus, the POS terminal or a representative payment beacon device or component may transmit one or more payment proxies relevant to the transaction. The payment proxy, in one implementation, relates to a financial account of the merchant or the merchant's business. In one example, the payment proxy may have a syntax of a monetary indicator preceding or suffixing an alphanumeric character. The POS terminal, through the payment beacon device or component, may also transmit the transaction receipt onto the customer device.

From here, the operation may flow to a customer device where the customer completes the transaction by utilizing the payment proxy for payment. This is explained in FIG. 5. Thus, in one implementation, the customer may enter the payment proxy in a messaging application/forum/website/third-party application and send the request a payment processing system. The payment processing system parses the payment proxy to determine a financial account of the merchant based on a stored association between the payment proxy and the financial account, where the stored association may be established in a previous transaction (e.g., account registration or a past money transfer). The payment processing system then completes the transaction by transferring funds from the customer's financial account to the merchant's financial account. Accordingly, a confirmation link is sent from the payment processing system to the customer device or merchant device or both.

At block 614, the POS terminal receives a confirmation link to confirm transfer of the total amount owed to the merchant from a financial account of the customer to the financial account of the merchant. In some embodiments, the confirmation message is sent to the merchant by using a merchant identifier (e.g., email address).

Figure 7A:
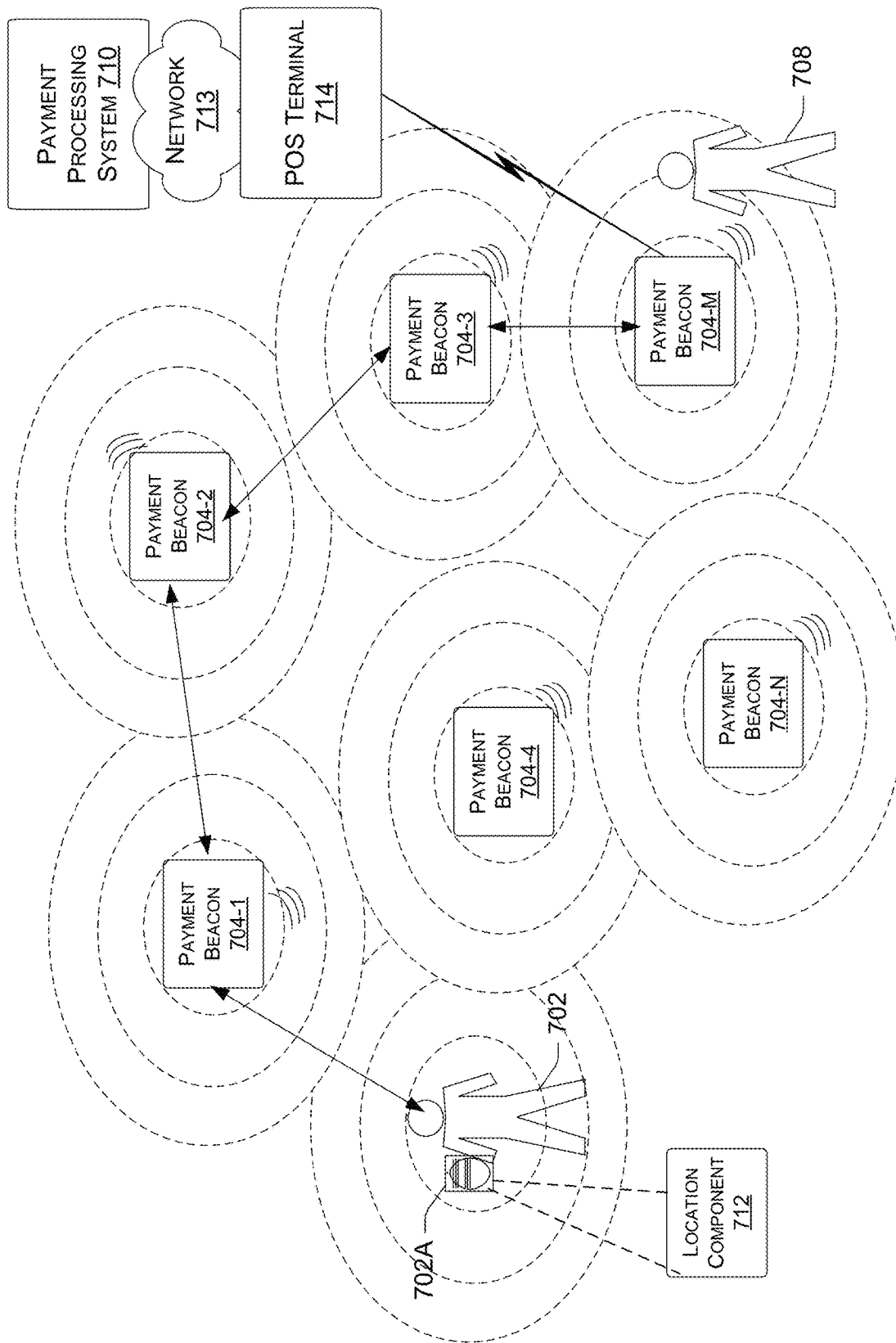
FIG. 7A is a network diagram of an exemplary scenario illustrating exchange of payment proxy between a customer device and a remote beacon or point-of-sale terminal through a mesh network, according to an embodiment of the present subject matter.

FIG. 7A is an exemplary scenario where a number of beacons interact with each other to transmit information to a requesting customer device through a mesh network, according to an implementation of the present subject matter. As shown, a customer 702 with access to a customer device 702A interacts with a payment beacon 704-1 in its vicinity. For example, a customer purchases or requests a product and/or service at a neighboring point-of-sale terminal or through a payment reader or beacon connected thereto. For example, consider a parking garage or a state park where the customer requests for initiation of a parking session by tapping or otherwise interacting with the payment beacon (hereinafter referred to "neighboring beacon.") In other embodiments, the payment beacon 704-1 activates on detecting, through sensor arrangement, a parked car at a parking location. In cases where the neighboring payment beacon 704-1 is not associated with the merchant, the neighboring payment beacon can establish a mesh network 706 with a remote payment beacon 704-M (assuming there are N payment beacons from 704-1, . . . 704-M, . . . 704-N) associated with the merchant 708 through several payment beacons in between the neighboring beacon 704-1 and the remote beacon 704-M.

The superimposing dotted circles indicate which beacons can communicate with each other. To use a neighboring beacon 704-1 for purposes of data acquisition from a remote beacon 704-M, the customer uses a user interface on the customer device or the beacon 704-1 and makes such an indication. The neighboring beacon 704-1 discovers paths from the neighboring beacon 704-1 to the desired remote beacon 704-M, or another neighboring beacon. In one implementation, the path passes through several beacons, e.g., through 704-2 and 704-3. The neighboring beacon 704-1 may choose a path of least "hops" and establishes a communication channel between the remote beacon and the neighboring beacon, or the customer device. In this case, the neighboring beacon 704-1 connects the customer 702 and his device 702A with the beacon 704-M through beacon 702-2. For this, the neighboring beacon 704-1 or the customer device 702A detects the location of the remote beacon 704-M through other available wireless or wired communication technologies working in conjunction with location determination technologies. For example, the remote beacon 704-M can transmit its location information using an internal GPS unit and Wi-Fi connection. Based on the distance, the neighboring beacon 704-1 can determine several routing paths, one of which is selected based on user preferences or parameters, such as costs, time, energy, etc., associated with the routing path.

The beacon 704-M then sends the payment proxy, and other such information through the selected "routing path" (shown by arrows). The customer 702 then uses the payment proxy to submit a payment request for a product or service to a payment processing system 710. In some cases where beacon 704-M is a POS terminal or is connected to the POS terminal 714, the customer device 702A can channel the payment request through the routing path.

In some implementations, the neighboring beacon 704-1 is only aware of the beacons in its vicinity and has no knowledge of the eventual destination node. As such, the neighboring beacon 704-1 cannot pre-design or select routing paths since the routing paths are dynamically changing and/or unavailable to that beacon. The neighboring beacon passes on the request or other such data to its neighbor until the merchant beacon 704-M is reached through, for example, an ad-hoc routing method. Again, the merchant beacon 704-M may be one-hop or several hops away. But, as long as a routing table, which is on-demand or constantly updated, exists with the beacons or the customer device, the customer device 702A can connect to the merchant beacon 704-M.

The term "hop" refers to the number of intermediate beacons or devices the routing path includes before the customer device and the desired remote beacon are connected. Accordingly, the routing path, i.e., the communication channel between the customer device 702A and a remote beacon 704-M can be a one-hop routing path or a multi-hop routing path based on whether there is one or several intermediate beacons between the customer device 702A, respectively.

While one-hop routing paths can be used, they suffer from problems such as low coverage area and being overloaded. One solution to this is the use of wireless mesh networks ("WMN"). Mesh networking is a way to route data, voice, video, and instructions between beacons (or nodes) of the network separated by several beacons. It allows for continuous connections and reconfiguration around broken or blocked paths by "hopping" from beacon to beacon until the destination is reached. Furthermore, Mesh Networking is particularly suited to wireless networks, where the connections can't be predicted in the same way as a wired network. Wireless mesh networking is mesh networking implemented over a wireless packet radio. It caters to mobile nodes, instant network growth and unpredictable variations in reception and coverage.

Mesh networks differ from other networks in that the component parts can all connect to each other via multiple hops, and they generally are not mobile. Thus each beacon in a mesh network can communicate with other nodes in its immediate neighborhood. Thus, a routing path can be a wireless co-operative communication infrastructure between a massive amounts of individual wireless transceivers (i.e. a wireless mesh) that have Ethernet-type capabilities.

This type of infrastructure is decentralized (with no central server) providing a relatively inexpensive, very reliable, and resilient system as each beacon need only transmit as far as the next node. Beacons thus act as repeaters to transmit data from nearby beacons to peers that would otherwise be too far away to reach, resulting in a network that can span large distances without wired cable in between, especially over rough or difficult terrain. Mesh networks are also extremely reliable, as each beacon is connected to several other beacons. When one beacon drops out of the network, due to hardware failure or any other reason, its neighbors can find another routing path in an ad-hoc manner. Extra capacity can be installed by simply adding more beacons.

Mesh networking operates on a principle similar to the way packets travel around the wired Internet-data hops from one device to another until it reaches a given destination. Dynamic routing capabilities included in each device within the network allow this to happen. To implement such dynamic routing capabilities, each device needs to communicate its routing information to every device it connects with, "almost in real time". Each device then determines what to do with the data it receives, either pass it on to the next device or keep it. Each beacon within the network must have a unique identity called a network address to facilitate peer-to-peer communication among the nodes. Due to the irregular and spontaneous nature of IP mesh network topology the address assignment becomes a non-trivial issue. To address this issue each mesh point in an 802.11 mesh networks use a MAC address allocated by the manufacture of the device. The Institute of Electrical and Electronic Engineers ("IEEE") 802.11 standard identifies services that must be provided by a distribution system. A distribution system, be it wireless or wired, is the fundamental part of a network as it is the mechanism by which one access point communicates with another to exchange frames, forward frames to follow mobile stations from one location to another, and to exchange frames with wired networks.

The routing path can be computed using one or more algorithms such as Ad-Hoc Mesh Routing (AHMR), Ad-hoc On-Demand Distance Vector Routing (AODV), Destination-Sequenced Distance Vector protocol (DSDV), Temporally-Ordered Routing Algorithm (TORA), Associativity Based Routing (ABR) and Dynamic Source Routing (DSR).

Most ad-hoc routing algorithms can be divided into one of two categories, namely, table driven algorithms, and source-initiated on-demand driven algorithms. Table driven algorithms are characterized by an attempt to maintain network-wide, consistent, and up-to-date information about the network and the routes from one node to any other node in the network. These algorithms are often associated with a constant propagation of routing information that is routine or triggered by topology changes. This information must be propagated to all nodes, which results in the algorithm incurring substantial amounts of overhead and network traffic. However, because a consistent view is constantly being updated on every node, there is little latency associated with sending initial packets, and routes are always defined. The result of constantly maintaining views of the network topology is accuracy which is a function of the size of the network. However, these algorithms do not scale well, and the level of network overhead increases drastically with the size of the network. Thus, these algorithms have poor scalability characteristics.

Also, available are source-initiated on-demand driven algorithms that build routes on demand, and when a source node requests. There is no need to maintain a consistent view of global network state on each component node, and as such, there is substantially less overhead necessary. However, there is a cost associated with the first query when a route to a specific destination is requested. Furthermore, this cost is incurred on every query to establish a route, which often occurs in association with a broken route. However, the substantially lower level of network overhead resulting from not having to keep a consistent view of the entire network topology on every node allows this class of algorithms to scale better than Table-Driven algorithms. However, these algorithms scale in proportion to the average length of routes. Thus, as length increases, overhead quickly increases.

In some embodiments, the methods and systems may describe the neighboring devices as intermediate devices and beacons that merely receive and send information; it will be understood that each of the neighboring devices may be associated with a respective payment proxy of a unique merchant or customer. As a result, the neighboring device can transmit the payment proxy in a manner similar to the merchant beacon.

Figure 7B:
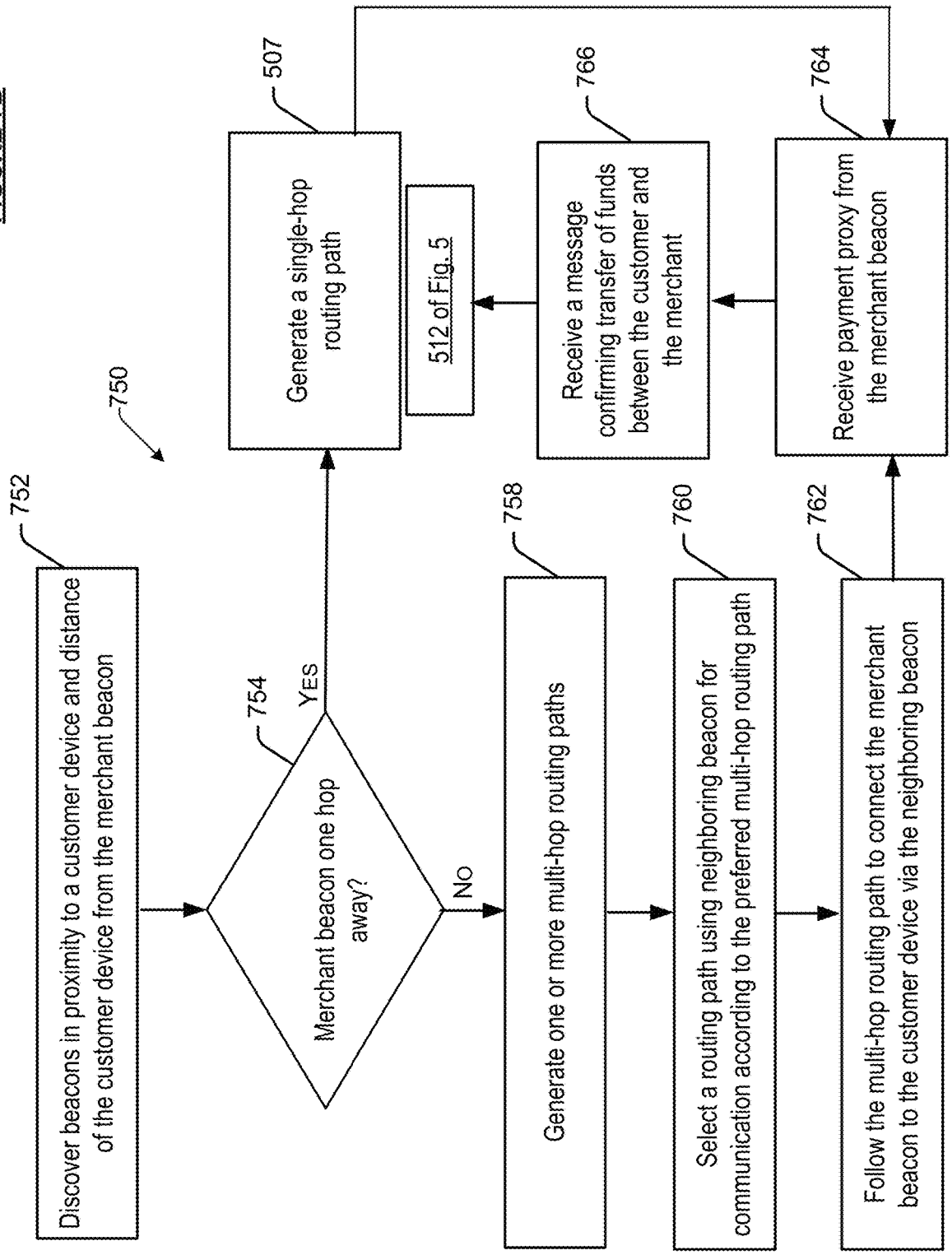
FIG. 7B is a flow diagram illustrating exchange of payment proxy between a customer device and a remote beacon or point-of-sale terminal through a mesh network, according to an embodiment of the present subject matter.

FIG. 7B is a flowchart illustrating an example process 750 of processing wireless payments between a merchant and a customer, or transferring funds between a sender and a recipient through a mesh of payment beacons or readers. The process 750 can be performed by one or more components, devices, or components such as, but not limited to, the customer devices, the Web server, the application server, the payment processing system, merchant device or point-of-sale (POS) terminal such as PPS controller 100, or payment beacon or other components or devices.

As illustrated in FIG. 7B, the process 750 includes a set of operations from block 752 to block 766. The components shown in FIG. 7A have been used for ease of explanation. The process 750 starts with the operation at block 752, where a location component 712 within a customer device 702A of a customer 702, discovers all neighboring beacons, e.g., beacons 704-1 and 704-4, and the location of the beacon-of-interest 704-M. For example, the beacon-of-interest 704-M transmits its location through a combination of GPS and wireless technologies to all neighboring beacons and the customer devices. The merchant beacon 704-M may also update a central routing table as and when its location changes. The neighboring beacons and the customer device can access the central routing table. The assumption is that the beacon of interest to the customer, in other words, the beacon or POS terminal 714 associated with the merchant 708 (hereinafter referred to as the merchant beacon) is a single or multiple hops or access points away.

At block 754, the location component 712 determines a routing path between the merchant beacon 704-M and the customer device 702A. More specifically, the location component 712 determines whether the merchant beacon 704-M is one hop away from the customer device 702A. If the determination yields a "Yes," i.e., if there are one or less than one neighboring beacons between the merchant beacon 704-M and the customer device 702A, the three (or two as the case may be) devices are connected by a one-hop routing path at block 756. However, if there are multiple beacons (or other such entities) between the merchant beacon 704-M and the customer device 702A, the customer device 702A determines several multi-hop routing paths at block 758. The multi-hop routing path includes a number of neighboring payment beacon devices proximate to the customer device. The methods and systems to find the most efficient routing path (where efficiency may be based on time, energy, or user-defined parameter) are not discussed herein in detail. Some methods may use the omnidirectional radio-wave propagation property of the beacons. The result is a set of algorithms that intelligently adapt routing paths for energy efficiency and reliability.

At block 760, the customer device 702A selects (either through signal strength determination or by user selection) a neighboring payment beacon, or the closest beacon as defined by the routing path(s). For example, based on a preferred routing path, the method includes activation of neighboring payment beacon 704-1 in proximity to the customer 702 either automatically or in response to sensing an activity, e.g., a voice or touch activation by a customer 702. Additionally, the customer device 702A submits a request for payment proxy to the selected beacon, optionally providing a preference of the routing path.

At block 762, the selected beacon communicates with the next beacon, for example, beacon 704-2, as dictated by the routing path. The beacons 704-1, 704-2, 704-3, . . . 704-(M-1), etc., keep creating communication channels or pathways until merchant beacon 704-M is reached. The selected beacons forward the payment request from the customer device 702A to the merchant beacon 704-M through the newly established routing path.

At block 764, the merchant beacon 704-M parses the request and sends its payment proxy (that may or may not be encoded and may also include additional information such as transaction summary with dollar amount associated with the requested service or product) back to the customer device 702A. The merchant beacon 704-M uses the previously established routing path, or any other that may be more time or energy efficient.

At block 766, the customer device 702A receives the payment proxy and optionally, other payment information, to complete the payment transaction. From here, the operation may flow to the customer device where the customer completes the transaction by utilizing the payment proxy for payment. This is explained in blocks 512, 514 and 516. Briefly described, in one implementation, the customer may enter the payment proxy in a messaging application/forum/website/third-party application and send the request a payment processing system. The payment processing system parses the payment proxy to determine a financial account of the merchant based on a stored association between the payment proxy and the financial account, where the stored association may be established in a previous transaction (e.g., account registration or a past money transfer). The payment processing system then completes the transaction by transferring funds from the customer's financial account to the merchant's financial account. Accordingly, a confirmation link is sent from the payment processing system to the customer device or merchant device or both.

In some embodiments, the merchant beacon 704-M or a POS terminal 710 connected thereto can process the transaction on behalf of the customer 702. In this case, the customer 702 sends his payment proxy to the POS terminal 710 via the established routing path. The POS terminal 714 then generates a message or a payment request on behalf of the customer and submits to the PPS 710 via network 713 (similar to network 104). The POS terminal 714 may send a confirmation request and/or notification of successful/unsuccessful payment transaction through to the customer 702 via the established routing path.

Figure 7C:
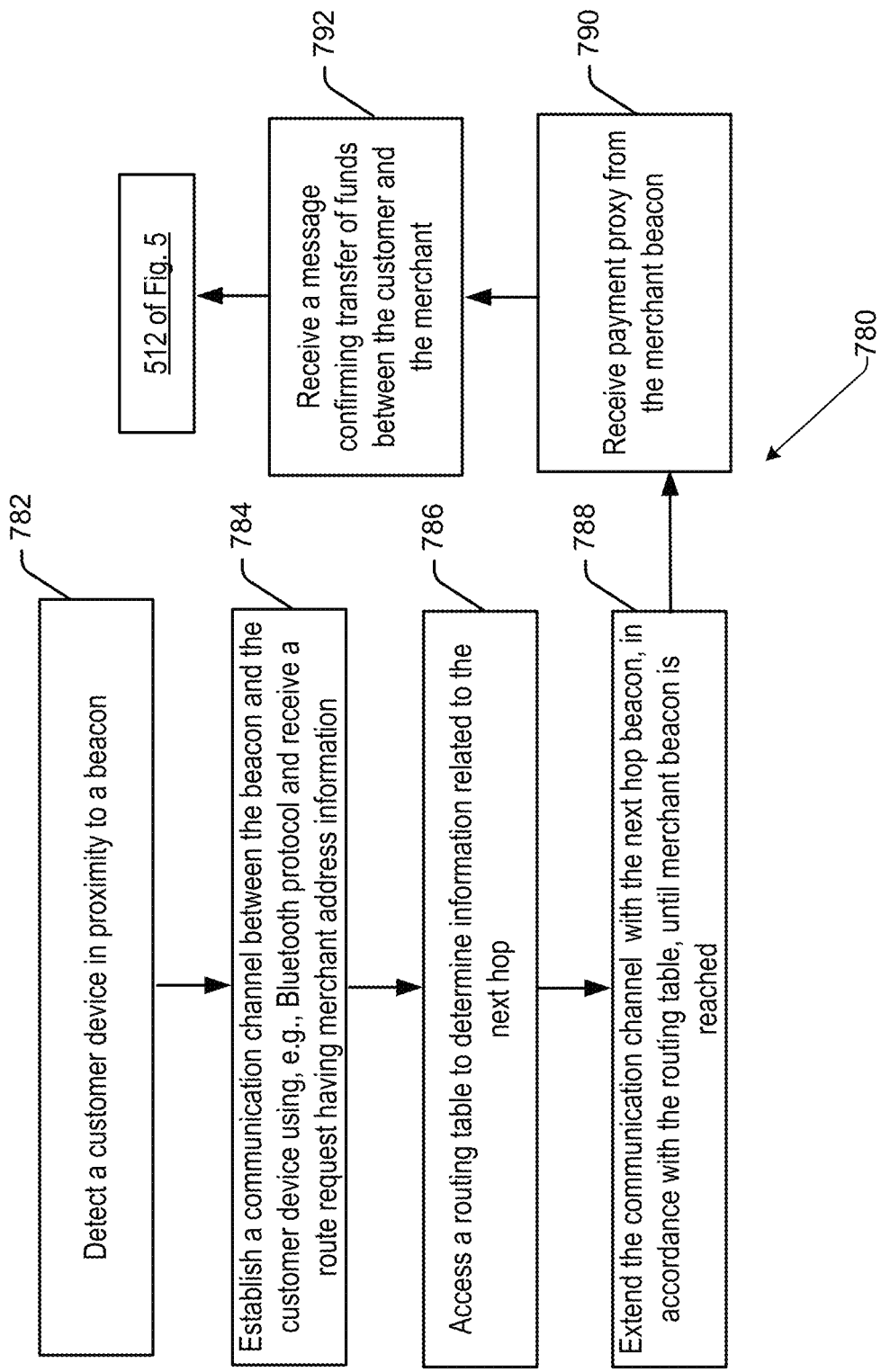
FIG. 7C is a flow diagram illustrating exchange of payment proxy between a customer device and a remote beacon or point-of-sale terminal through an ad-hoc mesh network, according to an embodiment of the present subject matter.

FIG. 7C is a flowchart illustrating an example process 780 of processing wireless payments between a merchant and a customer, or transferring funds between a sender and a recipient through a mesh of payment beacons or readers implementing ad-hoc routing algorithms. The ad-hoc routing algorithms include, for example, Ad-Hoc Mesh Routing (AHMR), Ad-hoc On-Demand Distance Vector Routing (AODV), Destination-Sequenced Distance Vector protocol (DSDV), Temporally-Ordered Routing Algorithm (TORA), Associativity Based Routing (ABR) and Dynamic Source Routing (DSR).

The process 780 can be performed by one or more components, devices, or components such as, but not limited to, the customer devices, the Web server, the application server, the payment processing system, merchant device or point-of-sale (POS) terminal such as PPS controller 100, or payment beacon or other components or devices.

As illustrated in FIG. 7C, the process 780 includes a set of operations from block 782 to block 792. The components shown in FIG. 7A have been used for ease of explanation. The assumption is that the destination node (e.g., merchant beacon) is one or multiple hops or access points away from the source node (e.g., customer device). The source node hops over intermediate node(s) to reach the destination node. Each of the devices have access to a routing table which is either stored locally or on an external server. The routing table includes the routing information to all the destination nodes in the wireless local area mesh network. The data packets are forwarded from the source node to the destination node by the intermediate nodes based on the routing tables along the path. To maintain the valid routes and to avoid the routing loops due to the link/node failure and network topology changes, each node periodically transmits route updates and/or broadcasts the updates immediately when significant new information is available.

The process 780 starts with the operation at block 782, where a location component 712 within a customer device 702A of a customer 702, discovers all neighboring beacons (intermediate nodes), e.g., beacons 704-1 and 704-4, that lie in the communication range of the customer device 702A. Alternatively and as shown, any beacon, e.g., 704-1 may detect any device, e.g., the customer device 702A (and its location) that enters its communication range, e.g., either automatically or in response to sensing an activity, e.g., a voice or touch activation by a customer 702. The nodes (source, destination and/or the intermediate) can periodically or on activation send beacons (e.g., HELLO messages) to their neighbors. A node receiving a beacon from a neighbor, updates the route lifetime associated with that neighbor in its routing table. If a node fails to receive a beacon from a neighbor for a given lifetime then the link to that neighbor is broken and the routing information for this neighbor is updated in its routing table.

At block 784, the beacon 704-1 establishes a communication channel with the customer device 702A in accordance with, for example, short-range communication protocols. This comprises as one hop. The beacon 704-1 also receives a route request (RREQ) message, which may include the source node address and any other additional information, e.g., address of the destination node, preferred route cost, etc. Additionally, the customer device 702A includes in the RREQ, a request for obtaining payment proxy. Optionally, at this step, the beacon 704-1 may calculate a metric, such as the route cost between the node from which it received RREQ message and itself and then establishes a reverse route to this originator in its routing table.

At block 786, the beacon 704-1 accesses the routing table, which is stored locally or on an external server, to determine information relating to the next beacon or node. The next beacon is selected based on the speed, load, reliability, or latency of any particular hop or even link cost.

At block 788, using the routing table, the beacon 704-1 establishes another communication channel or extends the existing communication channel with the next beacon. The beacon 704-1 propagates the RREQ message onto the next node along with updated metrics.

For example, the selected beacon communicates with the next beacon, for example, beacon 704-2, as dictated by the routing table. The beacons 704-1, 704-2, 704-3, . . . 704-(M-1), etc., keep creating communication links until merchant beacon 704-M is reached. The selected beacons forward the RREQ from the customer device 702A to the merchant beacon 704-M through the newly established routing path.

At block 790, the merchant beacon 704-M parses the request and sends its payment proxy (that may or may not be encoded and may also include additional information such as transaction summary with dollar amount associated with the requested service or product) back to the customer device 702A. The merchant beacon 704-M uses the previously established routing path, or any other that may be more time or energy efficient.

At block 792, the customer device 702A receives the payment proxy and optionally, other payment information, to complete the payment transaction. From here, the operation may flow to the customer device where the customer completes the transaction by utilizing the payment proxy for payment. This is explained in blocks 512, 514 and 516. Briefly described, in one implementation, the customer may enter the payment proxy in a messaging application/forum/website/third-party application/social networking tools, and send the request a payment processing system. The payment processing system parses the payment proxy to determine a financial account of the merchant based on a stored association between the payment proxy and the financial account, where the stored association may be established in a previous transaction (e.g., account registration or a past money transfer). The payment processing system then completes the transaction by transferring funds from the customer's financial account to the merchant's financial account. Accordingly, a confirmation link is sent from the payment processing system to the customer device or merchant device or both.

In some embodiments, the merchant beacon 704-M or a POS terminal 710 connected thereto can process the transaction on behalf of the customer 702. In this case, the customer 702 sends his payment proxy to the POS terminal 710 via the established routing path. The POS terminal 710 then generates a message or a payment request on behalf of the customer and submits to the PPS. The POS terminal 710 may send a confirmation request and/or notification of successful/unsuccessful payment transaction through to the customer 702 via the established routing path.

Some nodes want to join the wireless local area mesh network only as the source node or destination node, i.e., not forwarding the traffic originated from other nodes. A node can be configured as a non-forwarding node by the administrator or is determined to be a non-forwarding node based on certain policies. For example, one such policy is that if the energy in the battery of the node is less than a threshold, the node will become a non-forwarding node. A non-forwarding mesh node sends the RREQ message when it wants to transmit packets. It replies to the route request message only if it is the destination node in the received RREQ message. The non-forwarding node does not reply to the RREQ if it is not the destination node in the RREQ message. By so doing, there is no route using it as an intermediate node.

If a link breaks, the Route Error (RERR) message is sent to the affected source nodes of the active paths. The upstream node of the broken link, i.e. the node near the source, initiates the RERR message. Before sending the RERR message, it also marks the damaged routes invalid, sets the metric of the damaged routes to infinite, and increments the destination sequence numbers of the unreachable destinations due to this link failure in the routing table. The RERR message contains a list of all the unreachable destinations due to this link failure and their incremented sequence numbers. It broadcasts the RERR message to its one or more upstream neighbors. For a multi-interface node, it sends the RERR message on the interfaces with the routes using this failed link. When a neighbor receives a RERR message from its downstream node, it checks whether it has a route to use this downstream neighbor to the listed destinations. If so, it marks these routes as invalid and sets the metric of these routes to infinite. It then propagates the RERR message to its upstream nodes. When a source node receives the RERR message, it re-initiates the route discovery. If a node receives a data packet with a destination MAC address that does not have an active/valid route, the node creates a RERR message for the destination node and sends the RERR message to its upstream neighbors. t is necessary to support the quality of service (QOS) in WLAN mesh networks, e.g. for multimedia and video applications. To support the QoS, the QoS requirements, for example, maximum delay and minimum bandwidth requirements for data can be carried in the optional fields of an extended RREQ message. To respond or forward a RREQ message with QoS extensions, a node must be able to satisfy the QoS constraints. Otherwise, it discards this QoS RREQ message.

It should be noted that in another instance what are currently in FIG. 7C, source and destination nodes may be intermediate nodes in the instance that other nodes become source and destination nodes.

Regarding the processes 500, 600, 750, and 780, while the various steps, blocks or sub-processes are presented in a given order, alternative embodiments can perform routines having steps, or employ systems having steps, blocks or sub-processes, in a different order, and some steps, sub-processes or blocks can be deleted, moved, added, subdivided, combined, and/or modified to provide alternative or sub-combinations. Each of these steps, blocks or sub-processes can be implemented in a variety of different ways. Also, while steps, sub-processes or blocks are at times shown as being performed in series, some steps, sub-processes or blocks can instead be performed in parallel, or can be performed at different times as will be recognized by a person of ordinary skill in the art. Further, any specific numbers noted herein are only examples; alternative implementations can employ differing values or ranges.

What is claimed is:

1. A system comprising:
   a point of sale (POS) device configured to facilitate an order of goods or services exchanged for payment in a transaction;
   multiple other devices communicatively coupled over a short-range network with the POS device,
   wherein the POS device and the multiple other devices are configured to communicate with a remote server via a long-range network; and
   the POS device further configured to:
      detect an offline mode that prevents the POS device and the multiple other devices from communicating with the remote server via the long-range network;
      responsive to detecting the offline mode, authenticate the multiple other devices for communication over the short-range network;
      synchronize information associated with the order between the POS device and the multiple other devices over the short-range network; and
      responsive to detecting that the offline mode has concluded as to at least one other device of the multiple other devices, transmit the information associated with the order from the at least one other device to the remote server via the long-range network.

2. The system of claim 1, wherein the short-range network comprises a Wi-Fi network, Bluetooth Low Energy (BLE) network, or a Bluetooth network.

3. The system of claim 1, wherein the short-range network comprises a full mesh network and wherein at least the multiple other devices comprise nodes of the full mesh network.

4. The system of claim 1, wherein the short-range network comprises a partial mesh network and wherein at least the multiple other devices comprise nodes of the partial mesh network.

5. The system of claim 1, wherein at least one of the multiple other devices comprises a payment object reader.

6. The system of claim 1, wherein at least one of the multiple other devices comprises a customer device.

7. The system of claim 1, wherein the information comprises payment information associated with a payment for the order.

8. The system of claim 7, where the payment information comprises a payment proxy, wherein the payment proxy comprises data indicating a string of characters consisting of a monetary currency indicator preceding one or more alphanumeric characters.

9. A method comprising:
   detecting, by a point of sale (POS) device configured to facilitate an order of goods or services exchanged for payment in a transaction, an offline mode that prevents the POS device and multiple other devices from communicating with a remote server via a long-range network, wherein the multiple other devices communicatively couple with the POS device over a short-range network, and wherein the POS device and the multiple other devices are configured to communicate with the remote server via the long-range network;

responsive to detecting the offline mode, authenticating, by the POS device, the multiple other devices for communication over the short-range network;

synchronizing, by the POS device, information associated with the order between the POS device and the multiple other devices over the short-range network; and responsive to detecting that the offline mode has concluded as to at least one other device of the multiple other devices, transmitting, by the at least one other device to the remote server via the long-range network, the information associated with the order.

10. The method of claim 9, wherein the short-range network comprises a Wi-Fi network, Bluetooth Low Energy (BLE) network, or a Bluetooth network.

11. The method of claim 9, wherein the short-range network comprises a full mesh network and wherein at least the multiple other devices comprise nodes of the full mesh network.

12. The method of claim 9, wherein the short-range network comprises a partial mesh network and wherein at least the multiple other devices comprise nodes of the partial mesh network.

13. The method of claim 9, wherein at least one of the multiple other devices comprises a payment object reader.

14. The method of claim 9, wherein the information comprises payment information associated with a payment for the order.

15. The method of claim 14, where the payment information comprises a payment proxy, wherein the payment proxy comprises data indicating a string of characters consisting of a monetary currency indicator preceding one or more alphanumeric characters.

16. One or more non-transitory computer-readable media storing instructions executable by one or more processors that, when executed by the one or more processors, cause the one or more processors to perform acts comprising:

detecting an offline mode that prevents a point of sale (POS) device and multiple other devices from communicating with a remote server via a long-range network, wherein the multiple other devices communicatively couple with the POS device over a short-range network, and wherein the POS device is configured to facilitate an order of goods or services exchanged for payment in a transaction, and wherein the POS device and the multiple other devices are configured to communicate with the remote server via the long-range network;

responsive to detecting the offline mode, authenticating the multiple other devices for communication over the short-range network;

synchronizing information associated with the order between the POS device and the multiple other devices over the short-range network; and responsive to detecting that the offline mode has concluded as to at least one other device of the multiple other devices, transmitting, via the at least one other device, the information associated with the order to the remote server via the long-range network.

17. The one or more non-transitory computer-readable media of claim 16, wherein the short-range network comprises a Wi-Fi network, Bluetooth Low Energy (BLE) network, or a Bluetooth network.

18. The one or more non-transitory computer-readable media of claim 16, wherein the short-range network comprises a full mesh network and wherein at least the multiple other devices comprise nodes of the full mesh network.

19. The one or more non-transitory computer-readable media of claim 16, wherein the short-range network comprises a partial mesh network and wherein at least the multiple other devices comprise nodes of the partial mesh network.

20. The one or more non-transitory computer-readable media of claim 16, wherein at least one of the multiple other devices comprises a payment object reader.

* * * * *